United States Patent
Sano

(10) Patent No.: US 7,756,396 B2
(45) Date of Patent: Jul. 13, 2010

(54) SYSTEM AND METHOD FOR INPUTTING A TIMER RECORD SETTING OF A CONTENT AND PROGRAM THEREFOR

(75) Inventor: Ikuya Sano, Kanagawa (JP)

(73) Assignee: Sony Corporation (JP)

( * ) Notice: Subject to any disclaimer, the term of this patent is extended or adjusted under 35 U.S.C. 154(b) by 1140 days.

(21) Appl. No.: 11/393,537

(22) Filed: Mar. 30, 2006

(65) Prior Publication Data

US 2006/0222329 A1 Oct. 5, 2006

(30) Foreign Application Priority Data

Mar. 30, 2005 (JP) ............................ 2005-096995

(51) Int. Cl.
*H04N 5/76* (2006.01)
(52) U.S. Cl. ...................................................... 386/83
(58) Field of Classification Search .................. 386/83, 386/46, 124, 52; 725/50, 39, 56, 44–46, 725/38
See application file for complete search history.

(56) References Cited

FOREIGN PATENT DOCUMENTS

| JP | 2000-341156 | * | 12/2000 |
| JP | 2001-257986 A | | 9/2001 |
| JP | 2002-314911 A | | 10/2002 |
| JP | 2004-086288 A | | 3/2004 |
| JP | 2004-172682 A | | 6/2004 |
| JP | 2004-304835 A | | 10/2004 |
| JP | 2005-323055 A | | 11/2005 |

OTHER PUBLICATIONS

Machine generated translation of JP 2000-341156 to Yamada et al, Dec. 2000.*

* cited by examiner

*Primary Examiner*—David E Harvey
(74) *Attorney, Agent, or Firm*—Lerner, David, Littenberg, Krumholz & Mentlik, LLP

(57) ABSTRACT

An information processing system serves to input a timer record setting of a content. The system includes a dividing unit that divides a first timer record setting to record the content delivered from a predetermined source for a predetermined period into a plurality of second timer record settings each designed to record the content corresponding thereto, which is expected to be delivered for the predetermined period; a change unit that determines whether the content corresponding to each of the second timer record settings satisfies a predetermined condition, and changes a predetermined setting of the second timer record setting to record the corresponding content which has been determined to satisfy the predetermined condition using a change process preliminarily correlated with the predetermined condition; and an input unit that inputs the second timer record settings to record the corresponding contents, respectively, including the second timer record setting having the changed predetermined setting.

6 Claims, 17 Drawing Sheets

FIG. 7

SETTING TIMER SET PROPERTY CHANGE

- ORIGINAL TIMER SET PROPERTY IS CHANGED TO THE DESIGNATED PROPERTY BASED ON EPG WHEN THE FOLLOWING CONDITION IS MET FOR SETTING THE TIMER RECORD OF EACH PROGRAM.
- THE EFFECTIVE TERM OF THE CATEGORY IN WHICH THE USER IS NOT INTERESTED IS MADE SHORTER THAN THAT OF THE RECORDED PROGRAM, OR THE TIMER RECORD IS NOT SET IN ORDER TO MAKE A STORAGE PERIOD OF THE INTERESTED CATEGORY LONGER.
- RECORD MODE IS SELECTABLE DEPENDING ON THE CATEGORY, FOR EXAMPOLE, THE RECORD MODE OF THE SPORTS CAN BE DESIGNATED TO HIGH DEFINITION, AND THE RECORD MODE OF THE NEWS CAN BE DESIGNATED TO NORMAL.

LIST OF TIMER SET PROPERTIES:

|    | TYPE | CONDITION | PROPERTY TO BE CHANGED |
|----|------|-----------|------------------------|
| 1  | KEYWORD | WORLD HERITAGE | NOT TO ERASE AUTOMATICALLY, NORMAL (4M) |
| 2  | KEYWORD | CHATTING | LONG (2.5M) |
| 3  | CATEGORY | FOREIGN MOVIE | LONG (2.5M) |
| 4  | CATEGORY | JAPANESE MOVIE | LONG (2.5M) |
| 5  | CATEGORY | NEWS/REPORT | EFFECTIVE TERM 2 DAYS, TO ERASE AUTOMATICALLY, LONG (1.25M) |
| 6  | CATEGORY | VARIETY | EFFECTIVE TERM 1 DAY |
| 7  | KEYWORD | NO PROGRAM INFORMATION | EFFECTIVE TERM 0 |
| 8  | CATEGORY | OTHERS | EFFECTIVE TERM 0 |
| 9  | CATEGORY | DOCUMENTARY | EFFECTIVE TERM 0 |
| 10 | UNSET | | |
| 11 | UNSET | | |
| 12 | UNSET | | |
| 13 | UNSET | | |
| 14 | UNSET | | |
| 15 | UNSET | | |
| 16 | UNSET | | |
| 17 | UNSET | | |
| 18 | UNSET | | |
| 19 | UNSET | | |
| 20 | UNSET | | |

[ TOP ]   [ DOWN ]   [ CHANGE... ]   [ ERASE... ]

FIG.10

| PROGRAM | PROGRAM INFORMATION |
|---|---|
| PROGRAM A | "DRAMA", "ROMANCE", "ACTOR A", ⋯ |
| PROGRAM B | "DOCUMENTARY", "TRAVEL", "WORLD HERITAGE", ⋯ |
| PROGRAM C | "FOREIGN MOVIE", "ACTION", "ACTOR B", ⋯ |
| PROGRAM D | "DOCUMENTARY", "LIFE", "LARGE FAMILY", ⋯ |

SYSTEM AND METHOD FOR INPUTTING A TIMER RECORD SETTING OF A CONTENT AND PROGRAM THEREFOR

CROSS-REFERENCE TO RELATED APPLICATIONS

The present application claims priority from Japanese Patent Application No. JP 2005-096995 filed on Mar. 30, 2005, the disclosure of which is hereby incorporated by reference herein.

BACKGROUND OF THE INVENTION

The invention relates to an information processing system, an information processing method, and an information processing program. More particularly, the invention relates to the information processing system, method, and program thereof for improving a freedom degree of various types of setting, for example, selection between recording and not recording of the content, the timing for erasing the recorded content.

Recently a recording/reproducing device capable of recording and reproducing broadcast programs (formed of video and audio signals), for example, a hard disk video recorder has been in widespread use. The memory size of the recording medium that serves to record such program, for example, a hard disk has been considerably increased.

The recording/reproducing device with increased memory size as described above is capable of recording a larger number of broadcast programs than before. The user is allowed to record as many programs as possible, and to select the required program among those recorded.

Although the memory size of the recording medium like the hard disk may be increased as aforementioned, such capacity is still limited. Thereforee it is difficult for the hard disk to record the programs unlimitedly. In the case where the user has already recorded a predetermined or larger number of programs in the way as described above, the residual memory size becomes too small to record additional programs unless an appropriate number of the programs that have been already recorded are erased. The method of erasing the broadcast programs is disclosed in such publications as JP-A-2001-257986, JP-A-2002-314911, JP-A-2004-304835, JP-A-2004-172682, and JP-A-2004-86288.

The technologies that have been disclosed in the above-described publications fail to comply with the demand of the user as described below.

Specifically, it is difficult for the above-identified technologies disclosed in the above-described publications to cope with the demand of the user to improve the freedom degree of various settings, for example, selection between recording and not recording of the broadcast program, and setting of the timing for erasing the recorded program. They may fail to meet the demand not to record the broadcast program that does not comply with the user's preference, and to change the timing for erasing the program in accordance with the degree of the user's preference, and further, the demand to store the broadcast program with the higher preference of the user in the recording medium for a longer period, and to erase such program as news at an earlier timing compared with other programs.

SUMMARY OF THE INVENTION

According to an embodiment of the invention, the degree of freedom in performing various settings may be improved with respect to selection between recording and not recording of the program, the timing for erasing the recorded program and the like.

According to an embodiment of the invention, there is provided an information processing system which serves to input a timer record setting of a content. The information processing system includes a dividing unit that divides a first timer record setting to record the content delivered from a predetermined source for a predetermined period into a plurality of second timer record settings each designed to record the content corresponding thereto, which is expected to be delivered for the predetermined period; a change unit that determines whether the content corresponding to each of the second timer record settings satisfies a predetermined condition, and changes a predetermined setting of the second timer record setting to record the corresponding content which has been determined to satisfy the predetermined condition using a change process preliminarily correlated with the predetermined condition; and an input unit that inputs the second timer record settings to record the corresponding contents, respectively, including the second timer record setting having the changed predetermined setting.

According to the embodiment of the invention, a plurality of the predetermined conditions are provided to which corresponding priority orders are assigned, respectively. In the system, the change unit determines whether the content corresponding to each of the second timer record settings satisfies at least one of the plurality of predetermined conditions, and changes the predetermined setting of the content corresponding to the second timer record setting which has been determined to satisfy the at least one of the predetermined conditions using a change process preliminarily correlated with the condition assigned with the highest priority order among the at least one of the predetermined conditions determined to be satisfied.

According to the embodiment of the invention, the change process preliminarily correlated with the predetermined condition assigned with the predetermined priority order among the plurality of the predetermined conditions is used to change a first setting for recording the content that satisfies the predetermined condition assigned with the predetermined priority order to a second setting for inhibiting the recording thereof. In the embodiment, the input unit inhibits an input of the second timer record setting having the setting changed to the second setting through the change unit among the plurality of second timer record settings for recording the corresponding contents.

In the embodiment, there is provided a set unit which sets at least one of the plurality of predetermined conditions, the priority orders respectively assigned to the plurality of predetermined conditions, and the change process correlated with the plurality of predetermined conditions upon a command of a user.

According to an embodiment of the invention, there is provided an information processing method of an information processing system for inputting a timer record setting of a content. The method includes dividing a first timer record setting to record the content delivered from a predetermined source for a predetermined period into a plurality of second timer record settings each designed to record the content corresponding thereto, which is expected to be delivered for the predetermined period; determining whether the content corresponding to each of the second timer record settings satisfies a predetermined condition, and changing a predetermined setting of the second timer record setting to record the corresponding content which has been determined to satisfy the predetermined condition using a change process preliminarily correlated with the predetermined condition; and inputting the second timer record settings to record the corresponding contents, respectively, including the second timer record setting having the changed predetermined setting.

The program according to the invention corresponds to the information processing method of the invention as described above.

In the information processing system, information processing method, and information processing program, a first timer record setting to record the content delivered from a predetermined source for a predetermined period is divided into a plurality of second timer record settings each designed to record the content corresponding thereto, which is expected to be delivered for the predetermined period. It is determined whether the content corresponding to each of the second timer record settings satisfies a predetermined condition, to change a predetermined setting of the second timer record setting to record the corresponding content which has been determined to satisfy the predetermined condition using a change process preliminarily correlated with the predetermined condition. The second timer record settings to record the corresponding contents, respectively, including the second timer record setting having the changed predetermined setting, are input.

The device for recording the content may be formed as the information processing unit according to the invention, or another device. The unit that receives the input of the second timer record setting by each content may be formed as the information processing unit according to the invention, or another device. The unit for recording the content does not have to correspond to the unit that receives the input of the second timer record setting by each content.

The embodiment of the invention allows the timer record setting of the content to be input. Specifically, the degree of freedom in various settings, including selection between recording and not recording of the content and the timing for erasing the recorded content, may be improved by appropriately changing settings of the timer record setting.

BRIEF DESCRIPTION OF THE DRAWINGS

Embodiments of the present invention will be described in detail based on the following figures, wherein:

FIG. 7 is a view of an exemplary display for setting the timer set property change information used for the process executed by the setting unit shown in FIG. 4;

FIG. 10 is a view that represents an example of a correlation between broadcast programs contained in the serial timer record setting to be divided under the division timer record setting input process and the program information concerning therewith;

DETAILED DESCRIPTION

Figure 1:
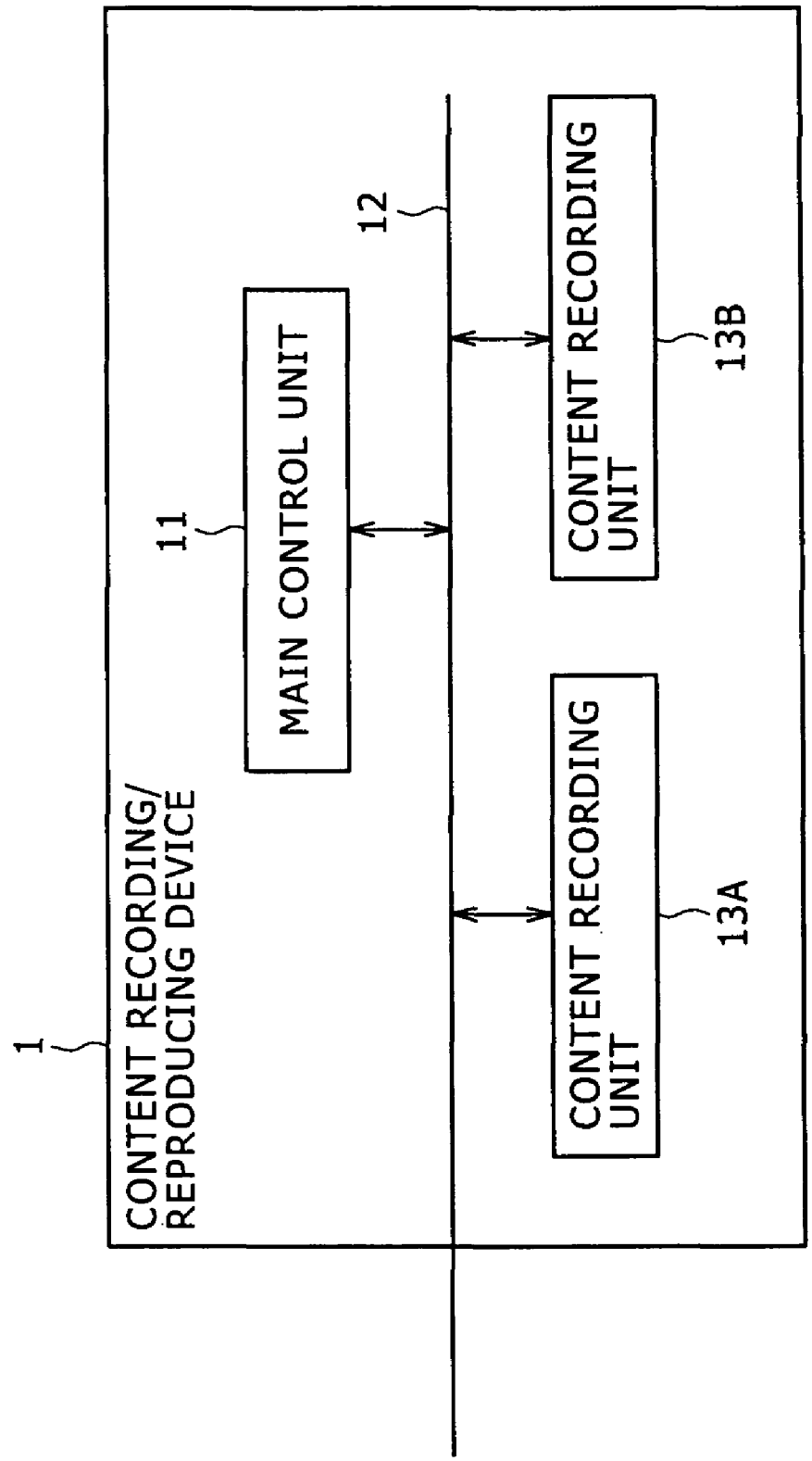
FIG. 1 is a block diagram that represents an exemplary hardware structure of a content recording/reproducing device to which the invention is applied.

An embodiment of the invention will be described referring to the drawings.

FIG. 1 represents an exemplary hardware structure of a content recording/reproducing device as an information processing device to which the invention is applied.

Referring to FIG. 1, a content recording/reproducing device 1 is formed by interconnecting a main control unit 11, and each of content recording units 13A, 13B via a network 12.

The network 12 may take an arbitrary form such as Ethernet™. The use of the network 12 may be omitted so as to allow direct communication between the main control unit 11 and the content recording units 13A, 13B without the network 12.

Hereinafter, the content recording units 13A and 13B will be referred to as a content recording unit 13 when those units do not have to be distinguished.

Referring to the exemplary structure shown in FIG. 1, the content recording/reproducing device 1 includes two content recording units 13 provided therefore. However, the number of the content recording units 13 is not limited to the value as shown in FIG. 1 but may be set to the arbitrary number. Likewise, the number of the main control unit 11 may also be set to the arbitrary value.

Figure 2:
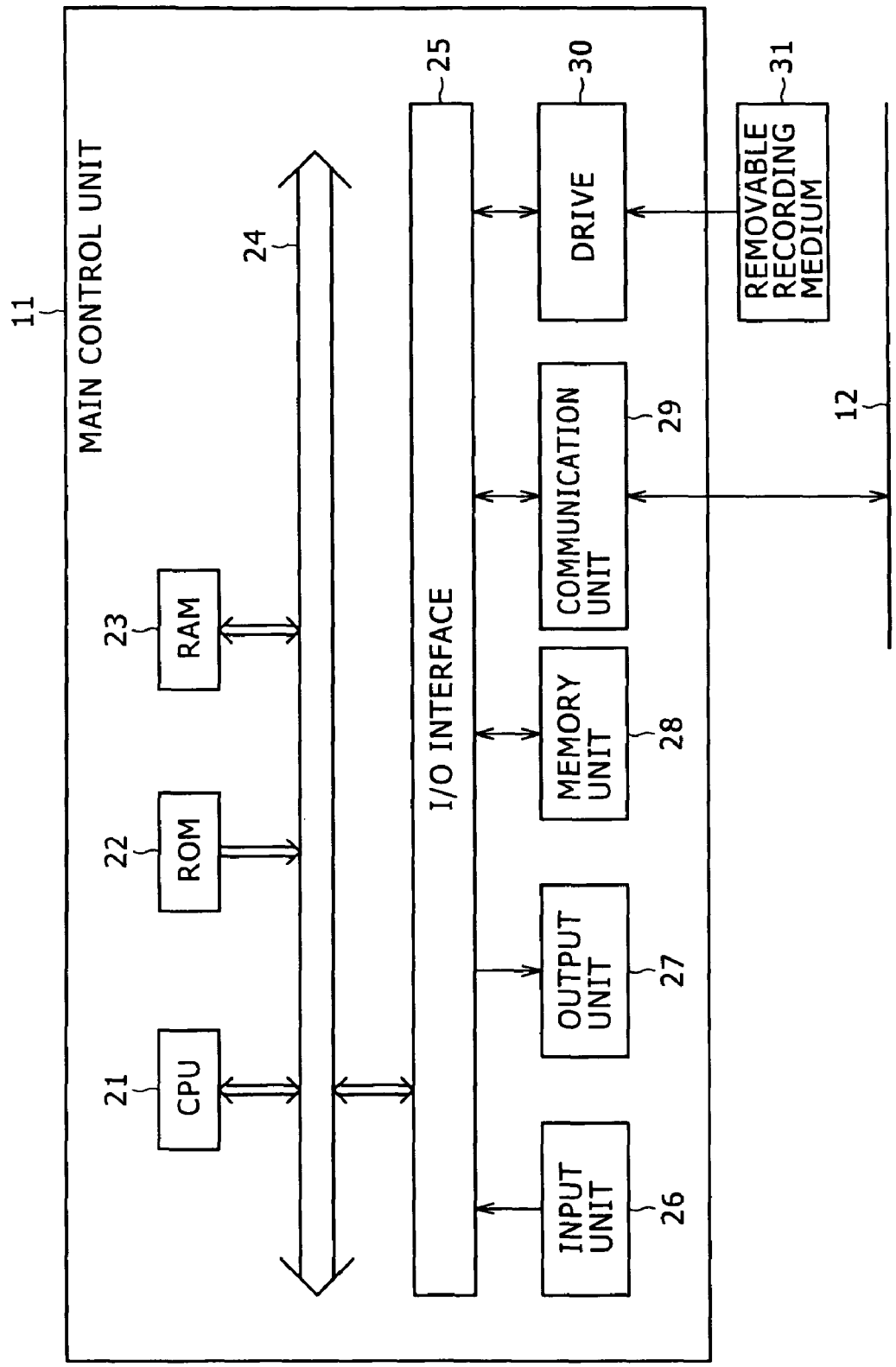
FIG. 2 is a block diagram that represents an exemplary hardware structure of a main control unit of the content recording/reproducing device.
Figure 3:
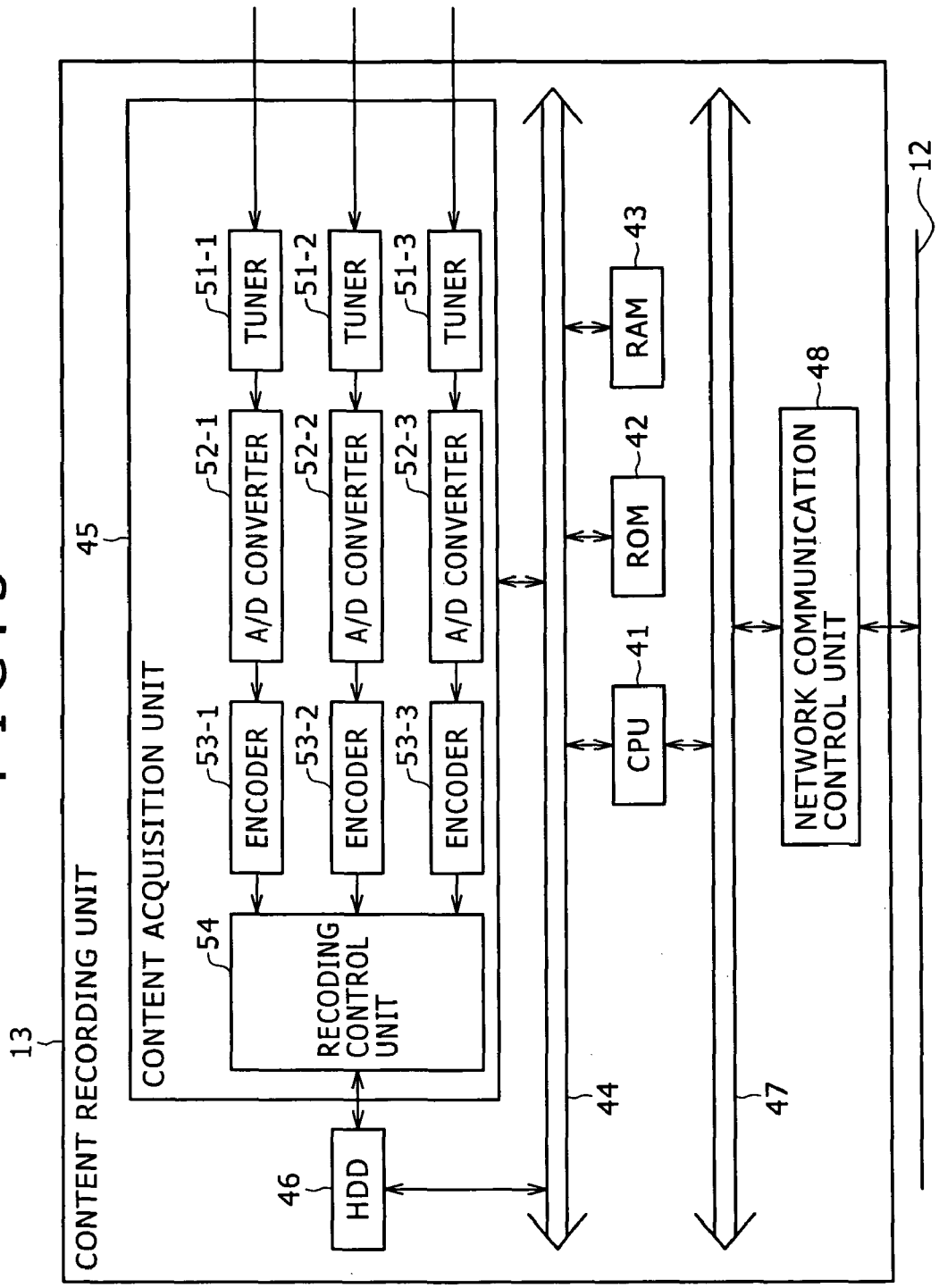
FIG. 3 is a block diagram that represents an exemplary hardware structure of a content recording unit of the content recording/reproducing device.

The detailed hardware structures of the main control unit 11 and the content recording unit 13 will be shown in FIGS. 2 and 3, respectively. Each of the hardware structure of the main control unit 11 and the content recording unit 13 will be explained referring to FIGS. 2 and 3, respectively.

Referring to FIG. 2, a CPU 21 of the main control unit 11 executes various types of processing in accordance with the program stored in a ROM 22 or the program loaded to a RAM 23 from a memory unit 28. The RAM 23 also stores data required for the CPU 21 to execute various types of processing.

The CPU 21, the ROM 22, and the RAM. 23 are interconnected via a bus 24 connected to an I/O interface 25.

The I/O interface 25 is connected to an input unit 26 including a keyboard, a mouse, a remote controller (with a light receiving portion) and the like, an output unit 27 including a speaker, and a display, a memory unit 28 including a hard disk, and a communication unit 29 that controls communication with other blocks (content recording units 13A and 13B) via a network 12. The communication unit 29 is connectable to other type of a network (not shown in FIG. 2) different from the network 12 (for example, a network 304 shown in FIG. 17 to be described later).

A drive 30 is connected to the I/O interface 25 if needed, which has a removable recording medium 31 including an electromagnetic disk, an optical disk, a magnetoptic disk, a semiconductor memory or the like mounted thereon such that the computer program that has been read therefrom is installed in the memory unit 28 if needed.

Figure 4:
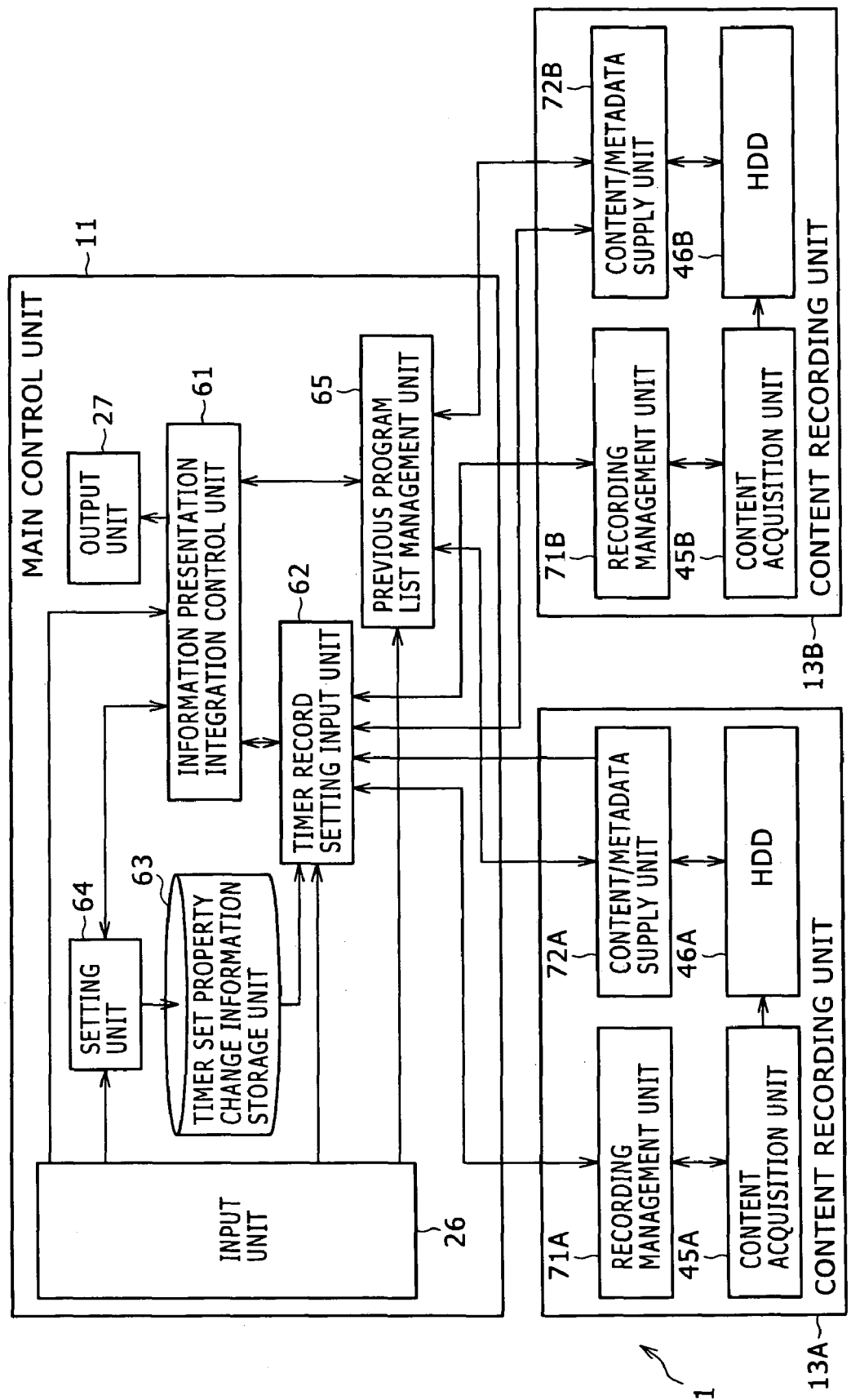
FIG. 4 is a block diagram that represents an exemplary functional structure of the content recording/reproducing device.

The hardware structure of the main control unit 11 is not limited to the example shown in FIG. 2, but may be arbitrarily formed so long as at least the functional structure as shown in FIG. 4 (described later) is provided.

An exemplary hardware structure of the content recording unit 13 will be described referring to FIG. 3.

A CPU 41 of the content recording unit 13 executes various types of processing in accordance with the program stored in a ROM 42. Alternatively the CPU 41 receives the program transmitted from the main control unit 11 shown in FIG. 1 via the network 12 so as to be loaded to a RAM 43 via a network communication control unit 48 and a bus 47. The CPU 41 executes various types of processing in accordance with the loaded program. The RAM 43 stores data required for the CPU 41 to execute the various types of processing.

The CPU 41, ROM 42 and RAM 43 are interconnected via a bus 44 connected to a content acquisition unit 45 and a HDD (Hard Disk Drive) 46.

The content acquisition unit 45 is structured to receive (acquire) a plurality of broadcast programs (contents) delivered from the corresponding broadcast stations in the same time slot simultaneously. Specifically, referring to FIG. 3, the content acquisition unit 45 is structured to receive three programs delivered from the corresponding three stations simultaneously. That is, the content acquisition unit 45 is provided with three tuners 51-1, 51-2, and 51-3, three A/D (Analog to Digital) converters 52-1, 52-2, and 52-3, and three encoders 53-1, 53-2, and 53-3, respectively.

The three tuners 51-1 to 51-3 will be referred to as a tuner 51 when they do not have to be distinguished. Likewise, the three A/D converters 52-1 to 52-3 will be referred to as an A/D converter 52 when they do not have to be distinguished. Also three encoders 53-1 to 53-3 will be referred to as an encoder 53 when they do not have to be distinguished.

The tuner 51 demodulates the terrestrial or satellite airwave for TV broadcasting, which has been received by an antenna (not shown) such that the resultant video and audio signals are supplied to the A/D converter 52.

When the airwave of the channel designated by the CPU 41 (correctly, the channel designated by a recording management unit 71A or 71B shown in FIG. 4 to be described later), that is, the radio wave that constitutes the program delivered from the broadcast station to which the channel is assigned is received by the antenna, the tuner 51 demodulates the received radio wave, and supplies the resultant analog video and audio signals to the A/D converter 52.

The broadcast program is delivered from the broadcast station. This will be represented by the expression that the broadcast program is broadcasted from the channel assigned to the broadcast station, for example, such expression as "the broadcast program delivered from the channel A" for the explanatory purposes.

The A/D converter 52 executes an A/D conversion with respect to the analog video and audio signals supplied from the tuner 51, and supplies the resultant digital video and audio signals to the encoder 53. The digital signals output from the A/D converter 52, that is, digital video and audio signals that constitute a predetermined broadcast program will be referred to as content data hereinafter.

The encoder 53 encodes (performs compression encoding) the content data supplied from the A/D converter 52 using, for example, MPEG (Moving Picture Experts Group) mode so as to be supplied into the recording control unit 54. The encoded content data output from the encoder 53 will be referred to as compressed content data hereinafter.

The recording control unit 54 stores respective compressed content data supplied from the encoders 53-1 to 53-3 in the form of files in the HDD 46.

The HDD 46 stores files that contain the compressed content data. The operation of "the HDD 46 that serves to store the compressed content data" will be represented by the expression that "the broadcast program corresponding to the compressed content data will be recorded". When the broadcast program does not have to be distinguished from the content data and the compressed content data that constitute the broadcast program, it may be simply represented as the broadcast program.

The HDD 46 does not always store the broadcast program one by one, but records the content of a predetermined channel specified by a single timer record setting. The content contains at least one broadcast program. More specifically, the HDD 46 does not always the entire program but only a part thereof. A single file recorded in the HDD 46 may contain one program delivered from a predetermined channel, or two or more programs delivered therefrom.

The above-described file will be referred to as a video capsule. That is, the video capsule includes at least a part (compressed content data) of one program or more, respectively.

The HDD 46 stores program information data (metadata) of the recorded program.

In the embodiment, the program information data stored in the HDD 46 are supplied from other server (not shown) connected to the network 12. That is, in the embodiment, the CPU 41 appropriately acquires the program information data of the respective programs via the network 12 and the network communication control unit 48, and stores such information data to the HDD 46.

The process of acquiring the program information data may have an arbitrary form without being limited to the embodiment of the invention. For example, the process of extracting the program information data in the vertical blanking period of the received terrestrial TV broadcast signal, or extracting the program information data from the received satellite TV broadcast signal may be employed.

The CPU 41 is connected to a bus 47 which is connected to a network communication control unit 48. The network communication control unit 48 executes the control of communication with other blocks (main control unit 11 and the like shown in FIG. 1) via the network 12.

The hardware structure of the content storage unit 13 is not limited to the example shown in FIG. 3, but may have an arbitrary form so long as at least the functional structure shown in FIG. 4 is provided.

It the case where the explanation below requires the content recording units 13A and 13B to be distinguished again, an alphabet "A" will be attached to the respective ends of reference codes of the CPU 41 to the network communication control unit 48 provided for the content recording unit 13A, that is, the CPU 41A to the network communication control unit 48A, respectively. Likewise, an alphabet "B" will be attached to the respective ends of reference codes of the CPU 41 to the network communication control unit 48 provided for the content recording unit 13B, that is, the CPU 41B to the network communication control unit 48B, respectively.

In the example as described above, six tuners are mounted on the content recording/reproducing device 1, that is, three tuners 51-1A to 51-3A for the content recording unit 13A, and three tuners 51-1B to 51-3B for the content recording unit 13B. (shown in the drawing). However, an arbitrary number of the tuner may be set without being limited to the example as described above. The position at which the tuner is mounted is not limited, and an arbitrary number of tuners may be mounted in the main control unit 11.

The example of the hardware structure of the content recording/reproducing device 1 to which the invention is applied has been explained referring to FIGS. 1 to 3.

The functional structure of the above-structured content recording/reproducing device 1 will be described referring to FIG. 4 representative of the exemplary functional structure of the content recording/reproducing device 1.

In the embodiment of the invention, as the main control unit 11 has the hardware structure shown in FIG. 2, each of units including information presentation integration control unit 61 to a previous program list management unit 65 except a timer set property change information storage unit 63 is structured as application software executed by the CPU 21 shown in FIG. 2. Each of those units has different hardware structure from that of the main control unit 11 such that each of the aforementioned units 61 to 65 except the unit 63 may be structured as a single unit of hardware, or as a combination of software and hardware. The timer set property change information storage unit 63 is structured to occupy an area of the memory unit 28 shown in FIG. 2. However, it may be structured to occupy an area of the respective memories (not shown).

In the embodiment, as each of the content recording units 13A and 13B has the hardware structure shown in FIG. 3 in the same manner as described above, the recording management units 71A and 71B, and content/metadata supply units 72A and 72B are structured as the application software executed by the CPU 41 as shown in FIG. 3. The hardware structure of the content recording unit 13A is different from that of the content recording unit 13B such that each pair of the recording management units 71A and the content/metadata supply units 72A, and those of 71B and 72B is structured as the single unit of hardware, or as the combination of software and hardware.

In the main control unit 11 shown in FIG. 4, the information presentation integration control unit 61 executes the control to subject various information data supplied from a timer record setting input unit 62, a setting unit 64, or the previous program list management unit 65 to a required processing so as to be output from the output unit 27.

More specifically, in the case where image data corresponding to one of images shown in FIGS. 6, 7, 8 and 16 (to be described later in detail) are supplied from the timer record setting input unit 62, the setting unit 64, or the previous program list management unit 65 to the information presentation integration control unit 61, the information presentation integration control unit 61 subjects the supplied image data to the required image processing, and further A/D conversion so as to supply the resultant analog image signals to the output unit 27. The output unit 27 then displays the image corresponding to the image signal supplied from the information presentation integration control unit 61, for example, one of the images shown in FIGS. 6, 7, 8, and 16.

In the case where a predetermined video capsule is supplied from the content recording unit 13A or 13B to the information presentation integration control unit 61 via the previous program list management unit 65, the information presentation integration control unit 61 decodes the compressed content data contained in the supplied video capsule at the MPEG mode, and supplies the resultant video and audio signals to the output unit 27. The output unit 27 then displays the image (motion image) corresponding to the supplied vide signal (motion image signal), and outputs sounds corresponding to the supplied audio signal. The output unit 27 serves to reproduce the broadcast program contained in the video capsule as the compressed content data.

The information presentation integration control unit 61 executes the process in response to an input of various commands from the input unit 26 (for example, the command for varying the output audio volume, reproducing the program, pausing, stopping, fast-forwarding and the like).

The timer record setting input unit 62 sets the timer record based on the information input from the input unit 26, that is, the content commanded by the user so as to inform the recording management unit 71A or 71B of the content recording unit 13A or 13B.

It is to be noted that the information data input from the input unit 26 include such data as "day of the week", "channel", "starting time", and "finish time", and the timer record setting input unit 62 sets the timer record based on the aforementioned information data. That is, the content of the timer record set by the timer record setting input unit 62 contains the information that "the program delivered from the channel required by the user is recorded in the time slot required by the user (during the time period between the starting time and the finish time set by the user on the day of every week set by the user).

The timer record set by the timer record setting input unit 62 as described above, in other words, the timer record set based on the information data including "day of the week", "channel", "starting time", and "finish time" will be referred to as "serial timer record setting".

The process executed by the timer record setting input unit 62 for informing the recording management unit 71A or 71B of the content of the set timer record (not only the serial timer record setting but also the timer record setting of the program divided from the serial timer record setting to be described later) will be referred to as "timer record setting input process" hereinafter. More correctly, the timer record setting input process includes holding of the content of the timer record setting that has been informed to the recording management unit 71A or 71B performed thereby in addition to the informing process executed by the timer record setting input unit 62.

The timer record setting input unit 62 sets the serial timer record setting so as to be input based on the information including the "day of the week", "channel", "starting time" and "finish time" set through the user's operation of the input unit 26.

It is further to be noted that the user is allowed to perform the serial timer record setting easily using the image for GUI (hereinafter referred to as the serial timer record image). The example of the serial timer record setting will be described referring to FIG. 6.

The timer record setting input unit 62 is capable of executing the process of dividing the input serial timer record setting into timer record settings of the programs, respectively (hereinafter referred to as the division timer record setting input process), respectively.

Figure 5:
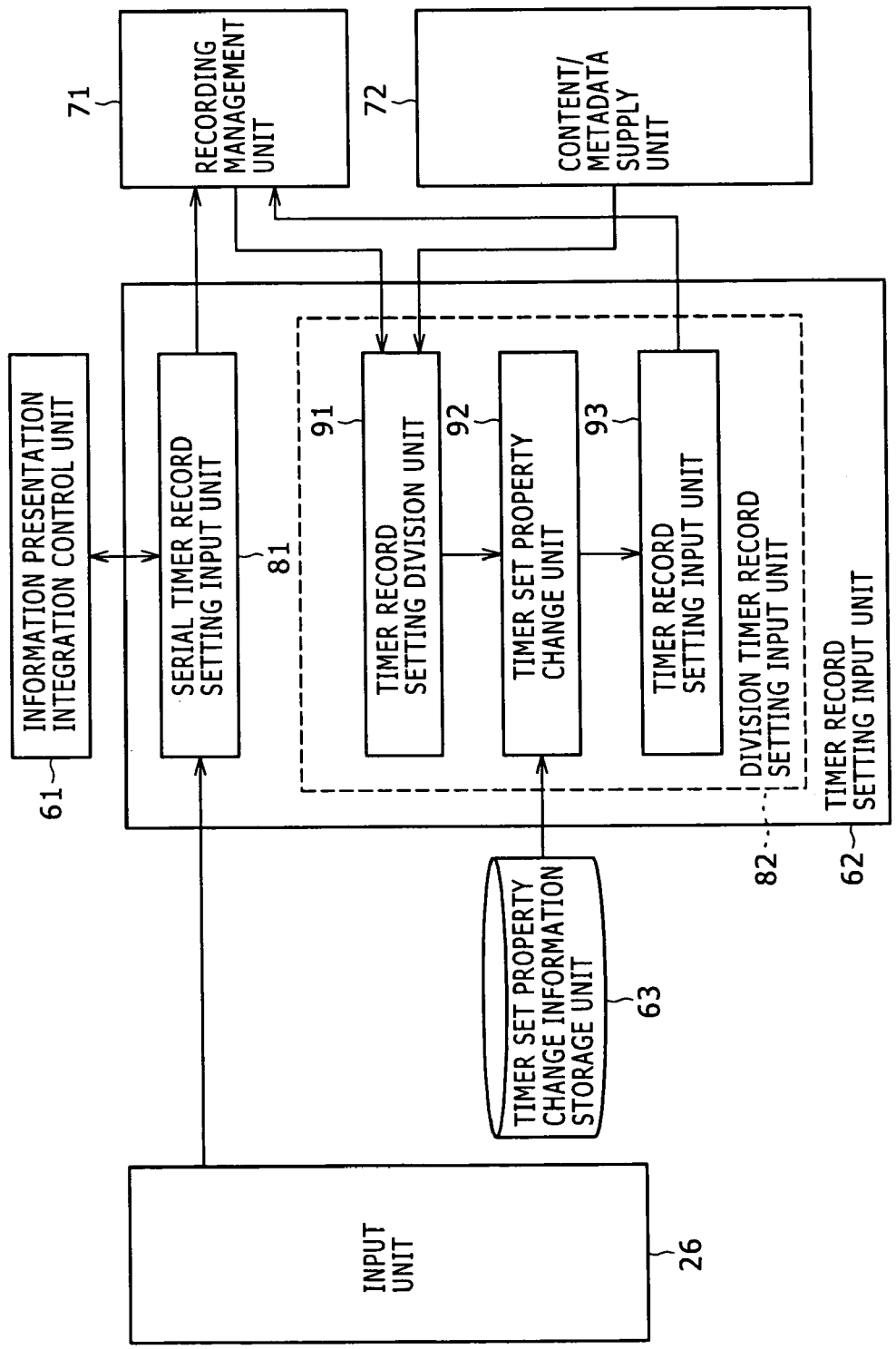
FIG. 5 is an exemplary block diagram that represents a functional structure of a timer record setting input unit shown in FIG. 4.

The timer record setting input unit 62 is capable of setting and inputting of the serial timer record setting (hereinafter referred to as a serial timer record setting input process), and the division timer record setting input process, respectively. In the embodiment, as shown in FIG. 5, the timer record setting input unit 62 is provided with a serial timer record setting input unit 81 for inputting the serial timer record setting, and a division timer record setting input unit 82 for inputting the division timer record setting. In other words, FIG. 5 represents a functional block diagram that shows a functional structure of the timer record setting input unit 62 in detail.

In the embodiment, the content recording unit 13A or 13B shown in FIG. 4 is designed to receive the input of the timer record setting. FIG. 5 shows the content recording unit 13 that receives the input of the timer record setting. In the example shown in FIG. 5, each code "A" or "B" of the recording management unit 71A or 71B, and the content/metadata supply unit 72A or 72B is omitted to show only the recording management unit 71 and the content/metadata supply unit 72, respectively.

The division timer record setting input unit 82 shown in FIG. 5 is formed of a program timer record setting division unit 91, a timer set property change unit 92, and a timer record setting input unit 93, respectively.

The program timer record setting division unit 91 automatically acquires the program information data delivered from the respective programs from the content/metadata supply unit 72 at a predetermined timing, and acquires the serial timer record setting of the program to be divided from the recording management unit 71. Based on the program information data, the serial timer record setting to be divided is automatically divided into timer record settings of the respective programs. Each of the timer record settings by the program will be supplied from the program timer record setting division portion 91 to the timer set property change unit 92.

The expression "automatically" represents that the block (unit) such as the timer record setting input unit 62 executes a predetermined process based on its own determination without using the input from outside of the input unit 26, that is, without the user's operation.

The timer set property change unit 92 determines whether each of the timer record setting of the respective programs satisfies a predetermined condition. If there is the timer record setting of the program determined as satisfying the predetermined condition, a predetermined timer set property (predetermined setting) will be changed through the change process preliminarily correlated to the predetermined condition. The timer set property change unit 92 refers the timer set property change information data stored in the timer set property change information storage unit 63. The timer set property change unit 92 supplies the respective timer record settings of the respective programs to the timer record setting input unit 93 irrespective of the presence/absence of the change in the timer set properties.

Explanations with respect to the timer set property, the change thereof, and the timer set property information will be described in detail referring to FIG. 7.

A timer record setting input unit 93 automatically inputs the timer record setting by the program supplied from the timer set property change unit 92 to the recording management unit 71. Incidentally, as will be described below, when the input of the timer record setting of the program is inhibited as a result of changing a predetermined timer set property by the timer set property change unit 92, to cite a case, the "effective term" is changed to "0" (as described below in an embodiment of the invention), the inhibited timer record setting might be supplied therefrom to the timer record setting input unit 93. In such a case, the timer record setting input unit 93 will not input the timer record setting of the program, that is, inhibits the input of the timer record setting of the program.

The division timer record setting input unit 82 will be described using the specific example. It may be the case that the serial timer record setting has been input to record the "program delivered from the channel A in the time slot between 8 a.m. and 1 p.m. on every Tuesday", and a first program is delivered from the channel A in the time slot between 8 a.m. and 11 a.m. on the next Tuesday, and a second program is delivered in the time slot between 11 a.m. and 1 p.m. That is, each program information data of the first and the second programs contains information that specifies the content of the program expected to be on the air.

It may also be the case where a first condition for. changing the "record mode" as one of the timer set properties to "long (2.5 M)" is established, and a second condition for changing the "effective term" as one of the timer set properties to "0" is established. The "record mode" represents the mode for setting the image quality and sound quality, and the "effective term" herein represents the length of time for which the recorded program is kept stored in the HDD 46. When the effective term expires, the recorded program is automatically erased. The detailed explanation of the automatic erasure will be described in detail later. The effective term set at 0 represents that the timer record setting is not input. This represents inhibition of recording the content of the subject timer record setting (program on the air) to-the HDD 46. As will be described later, the first and the second conditions, and the content of the changed timer set property obtained when the first or the second condition is established are preliminarily stored in the timer set property change information storage unit 63 as the timer set property change information data.

In the above-described case, the program timer record setting division unit 91 automatically acquires the program information data of the first and the second program information data from the content/metadata supply unit 72 at a predetermined timing before 8 a.m. on the next Tuesday. Upon acquiring the program information, the timer record setting input unit 62 automatically divides the serial timer record setting to be divided into the first and second timer record settings, respectively.

The timer set property change unit 92 changes the "record mode" to "long (2.5M)" with respect to the timer record setting of the first program based on the timer set property change information stored in the timer set property change information storage unit 63, and changes the "effective term" to "zero" with respect to the timer record setting of the second program based on the timer set property change information stored in the timer set property change information storage unit 63.

The timer record setting input unit 93 inputs the timer record setting of the first program which includes the set information for recording the program at the "long (2.5M)" mode to the recording management unit 71.

The timer record setting of the second program is not input by the timer record setting input unit 93 as the "effective term" has been changed to "0". Adding information about this will be described below. The timer record setting of the program that satisfies the second condition for changing the "effective term" to "0" is not input. Accordingly the program is not recorded in the HDD 46, resulting in the efficient use of the limited memory space of the HDD 46.

The timing for inputting the timer record setting of the first program may be the same as that of the second program, or may be different therefrom. As one example of the different timing, the timer record setting of the second program may be input subsequent to the input of the timer record setting of the first program which is expected to be on the air earlier.

The process of inputting the division timer record setting executed by the division timer record setting input unit 82 will be described in more detail referring to FIGS. 9 to 15.

Referring back to FIG. 4, as described above, the timer set property change information storage unit 63 stores at least one piece of the timer set property change information data. The timer set property change information is defined as the one for changing a predetermined timer set property using a predetermined change process upon establishment of a predetermined condition. The timer set property change information data are set by the setting unit 64. That is, the setting unit 64 sets (generates) the timer set property change information so as to be stored in the timer set property change information storage unit 63 based on the predetermined condition or the timer set property to be changed by the user's operation of the input unit 26.

It is to be noted that the user is allowed to set the timer set property change information easily using the image for GUI (hereinafter referred to as the image for setting the timer set property change information). The example of the image for setting the timer set property change information will be described later in more detail referring to FIGS. 7 and 8.

The previous program list management unit 65 acquires the program information (metadata) of the program currently recorded in the HDD 46A or 46B (hereinafter referred to as the recorded program) via the content/metadata supply unit 72A or 72B.

Based on various types of the acquired program information data, the previous program list management unit 65 generates the table having the respective program to be recorded (correctly, the section that shows the recorded program which will be referred to as the program listing) arranged in the order of the broadcasting time schedule by the corresponding channel in the form of the image data so as to be supplied to the information presentation integration control unit 61. The aforementioned table is referred to as the previous program schedule. The example of the previous program schedule will be described in detail referring to FIG. 16.

Figure 16:
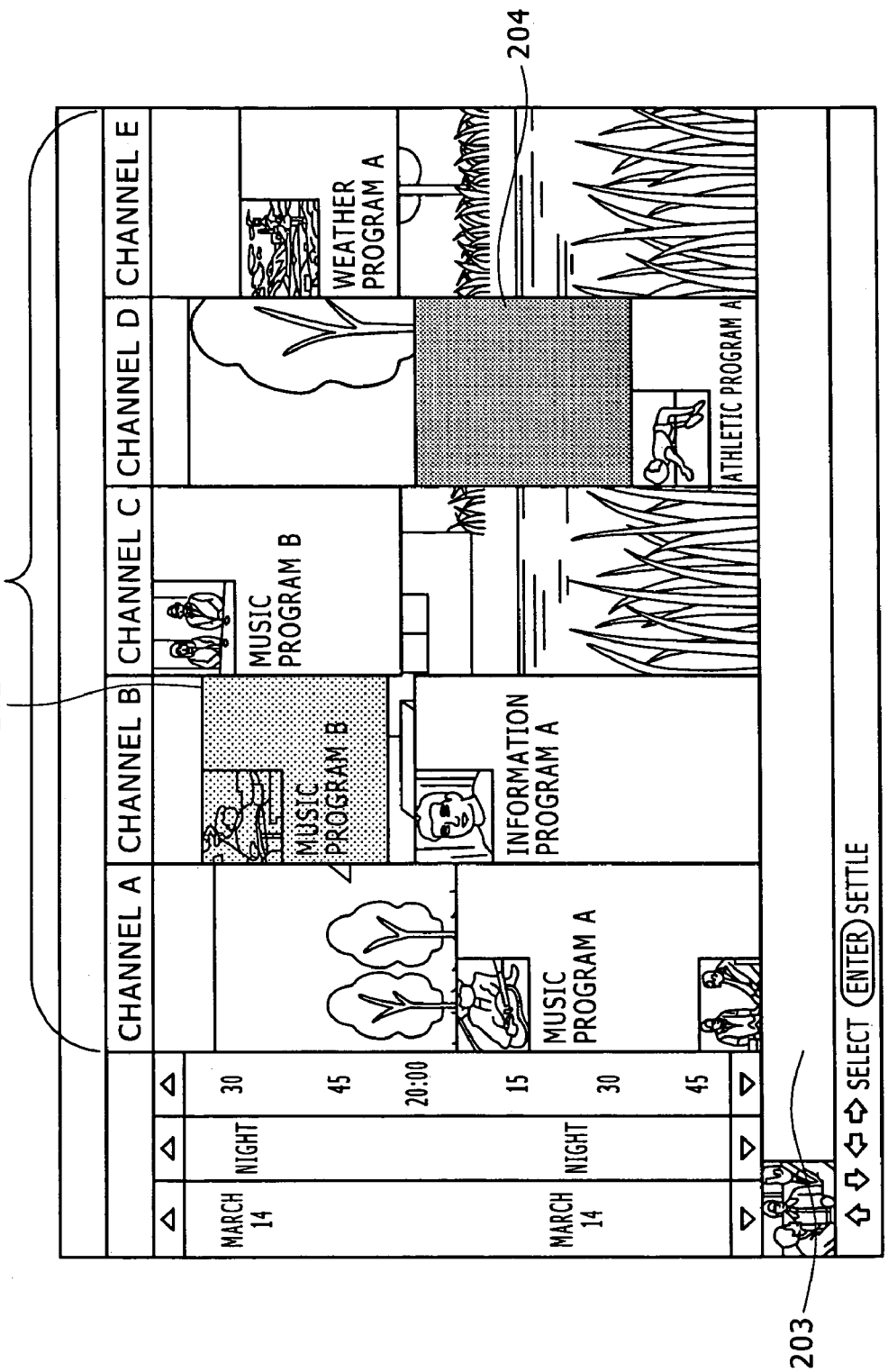
FIG. 16 is an exemplary display image that shows a part of the previous program schedule used in the process executed by the previous program schedule management portion shown in FIG. 4.

Upon receipt of the image data of the previous program schedule, the information presentation integration control unit 61 allows the image corresponding to the image data, that is, the previous program schedule as shown in FIG. 16 to be displayed on the output unit 27.

The user is able to easily locate the required program to be recorded by looking through the previous program schedule displayed on the output unit 27.

Further the user is allowed to select and reproduce the recorded program. That is, the user is capable of operating to select and reproduce a predetermined recorded program using the input unit 26.

The aforementioned operation of the user supplies the command for reproducing the recorded program to the previous program list management unit 65 from the input unit 26. Then the previous program list management unit 65 acquires the recorded program, which is designated by the reproducing command (the video capsule that contains the program) from the HDD 46A or 46B via the content/metadata supply unit 72A or 72B so as to be supplied to the information presentation integration control unit 61.

The information presentation integration control unit 61 decodes the recorded program contained in the video capsule (compressed content data) using the MPEG mode, and supplies the resultant video and audio signals to the output unit 27. The output unit 27 displays the video image (motion image) corresponding to the supplied video signal and outputs sound corresponding to the supplied audio signal. In other words, the output unit 27 reproduces the recorded program, which has been selected by the user.

An example of the functional structure of the main control unit 11 has been described referring to FIG. 4.

An example of the functional structure of the content recording unit 13A or 13B will be explained referring to FIG. 4. In the example shown in FIG. 4, the content recording unit 13A has basically the same functional structure as that of the content recording unit 13B. There is, thus, no need of distinguishing the content recording unit 13A from 13B, and the functional structure will be described with respect to the content recording unit 13 hereinafter by omitting the code "A" or "B" attached to each end of the reference codes of the respective blocks shown in FIG. 4.

The recording management unit 71 inputs the timer record setting (apart of the process) as described above. That is, the recording management unit 71 holds the content of the timer record setting informed from the timer record setting input unit 62. As described above, the timer record setting informed (input) from the timer record setting input unit 62 includes not only the serial timer record setting but also the timer record setting by the program, which has been divided therefrom.

The recording management unit 71 executes the control for recording the program to the HDD 46 in accordance with the content of the input (held) timer record setting. That is, the recording management unit 71 allows the content acquisition unit 45 to acquire the program content delivered from the channel designated by the timer record setting in the time slot designated by the input timer record setting (the starting time, finish time, and the time slot specified by the day of the week if needed, which are contained in the content of the timer record setting) such that the resultant video capsule is stored in the HDD 46.

The video capsule that includes the content of the program delivered from the designated channel in the designated time slot by the timer record setting (at least one broadcast program as described above) is recorded in the HDD 46.

The content/metadata supply unit 72 acquires the program information data (metadata), which has been commanded by the timer record setting input unit 62 or the previous program list management unit 65, from the HDD 46 and supplies the program information data to the timer record setting input unit 62 or the previous program list management unit 65.

The content/metadata supply unit 72 acquires the video capsule that contains the program to be recorded (compressed content data), which has been commanded by the previous program list management unit 65, from the HDD 46 and supplies the video capsule to the previous program list management unit 65.

The example of the functional structure of the content recording/reproducing device 1 has been described.

As described above, the content recording/reproducing device 1 is capable of setting the serial timer record with respect to "the program delivered from the channel designated by the user in a predetermined time slot on a day of every week designated by the user" so as to be input.

Figure 6:
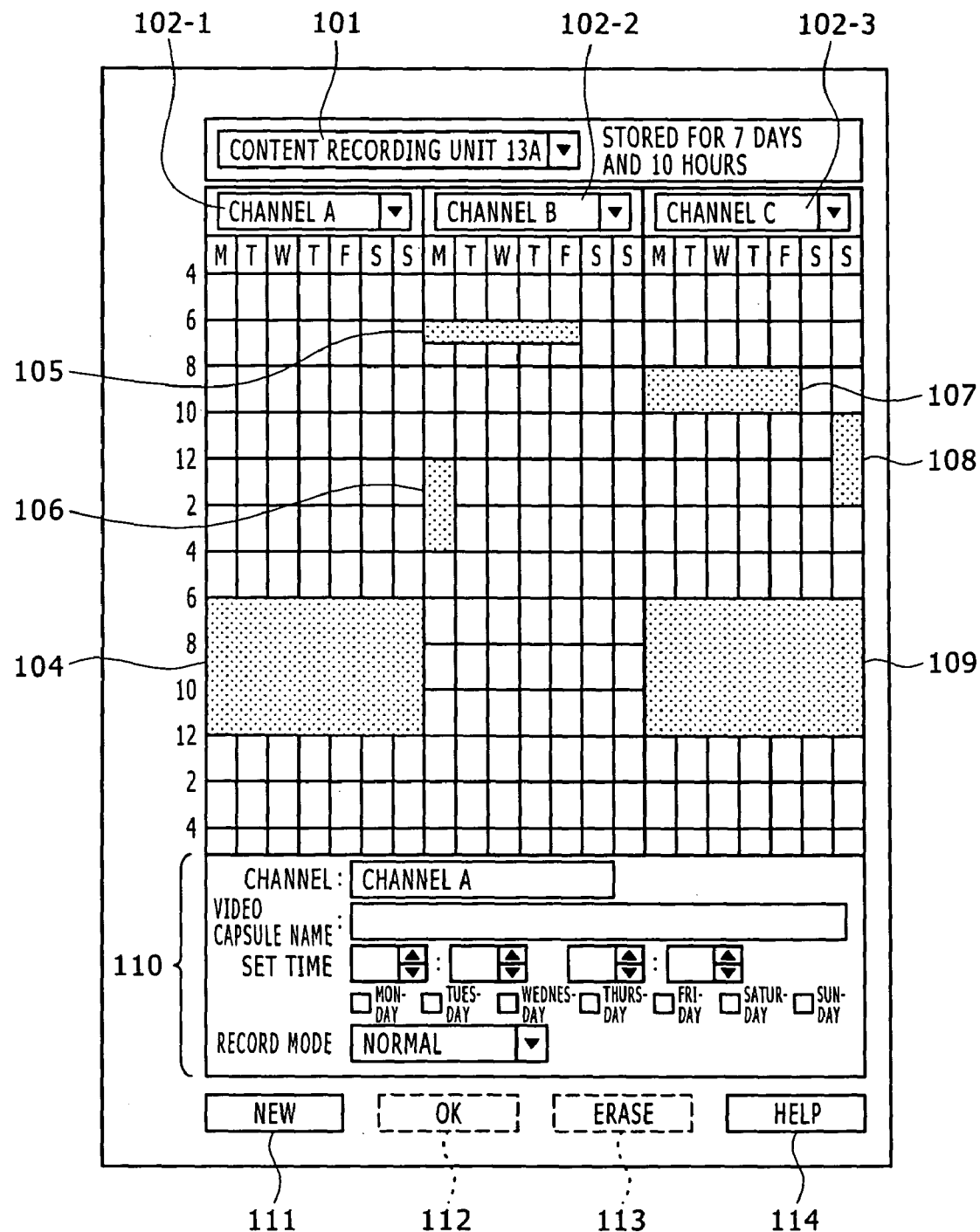
FIG. 6 is a view of an exemplary display of a serial timer record setting for inputting the serial timer record setting performed by the serial timer record setting input unit.

The user is allowed to easily have an operation of setting the serial timer record as described above using the image for the serial timer record setting as shown in FIG. 6 which will be described later.

The content recording/reproducing device 1 is capable of dividing the input serial timer record setting into the timer record settings by the program based on the respective program information data corresponding to the programs, and changing a predetermined property of the timer record setting if needed so as to be input.

The division timer record setting input unit 82 shown in FIG. 5 is provided in the timer record setting input unit 62. The structure is not limited to the above-described form. For example, it may be provided in each of the content recording units 13A and 13B, respectively. In this case, the timer record setting input unit 62 is expected only to input the serial timer record setting to the content recording units 13A and 13B such that each of the content recording units 13A and 13B executes the process of division timer record setting.

Let us suppose that the serial timer record setting has been input to "record the program delivered from the channel A in the time slot between 8 a.m. and 1 p.m. on Tuesday" likewise the aforementioned example. Let us also suppose that a first program is delivered from the channel A in the time slot between 8 and 11 a.m. on the next Tuesday, and then a second program is scheduled to be delivered from the channel A from 11 a.m. to 1 p.m. In short, each program information of the first and the second programs contains data that specify the contents of those programs to be delivered, respectively.

Let us suppose that a first condition for changing the "record mode" to "long (2.5 M)" as one of the timer set properties of the first program is established, and a second condition for changing the "effective term" to "0" as one of the timer set properties of the second program is established. Incidentally, as described above, the change in the timer set properties upon establishment of the first condition and/or the second condition is preliminarily stored in the timer set property change information storage unit 63.

In this case, the content recording unit 13A or 13B (hereinafter referred to as a content recording unit 13) automatically acquires the program information data of the first program stored in the HDD 46 at a predetermined timing before 8 a.m. on the next Tuesday, for example, at 7:55 a.m., and then, automatically divides the serial timer record setting to be divided into the timer record setting of the first program based on the program information data.

The content recording unit 13 changes the "record mode" for the timer record setting of the first program to "long (2.5M)" based on the timer set property change information data stored in the timer set property change information storage unit 63.

Then the content recording unit 13 inputs the timer record setting of the first program, which contains the set information representing that the program is recorded at the record mode set to "long (2.5M)".

On the next Tuesday at around 8 a.m., the content recording unit 13 works to control the recording of the first program into the HDD 46 so that the video capsule that contains the first program is recorded into the HDD 46.

Further at a timing 5 minutes before 11 a.m. on the next Tuesday, that is, 10:55 a.m., the content recording unit 13 automatically acquires the program information data of the second program stored in the HDD 46, and automatically divides the timer record setting of the second program from the subject serial timer record setting.

The content recording unit 13 changes the "effective term" to "0" in the timer record setting of the second program based on the timer set property change information data stored in the timer set property change information storage unit 63.

The content recording unit 13 thus inhibits the input of the timer record setting of the second program (input is not executed). The content recording unit 13 does not start controlling with respect to the recording of the second program into the HDD 46 even on the next Tuesday at 11 a.m. As a result, the video capsule that contains the second program is not recorded in the HDD 46.

In a different view from the recording management unit 71, the serial recording corresponding to the serial timer record setting of the channel A is under a control of the recording management unit 71 which changes a predetermined timer set property if needed at each timing for starting the respective programs including the first and the second programs. In the case where the timer set property is changed, for example, changing the "effective term" to "0", the recording management unit 71 serves to inhibit the control of the serial recording of the channel A from the timing for starting the program having the timer set property changed (second program in the aforementioned example) to the timing for starting the subsequent program.

The serial timer record setting may be defined as the timer record setting for recording entire contents delivered from a predetermined source (broadcast station) during a predetermined period. The predetermined period may be defined as being infinite. Based on the above-described definition, the timer record setting for 24 hours may be considered as one form of the serial timer record setting. Accordingly, the record management unit 71 is capable of changing the predetermined timer set property in need at the timing for starting the respective programs in the case of serial timer record setting for 24 hours. The recording management unit 71 is capable of inhibiting the control of the serial recording for 24 hours from the timing for starting the program having the timer set property changed to the timing for starting the next program in the case where the timer set property is changed, for example, the "effective term" is changed to "0".

The exemplary structure of the content recording/reproducing device 1 has been described referring to FIGS. 1 to 5.

Referring to FIG. 6, the operation required for the user to set and input the serial timer record setting will be described. That is, FIG. 6 represents an example of the serial timer record setting output through the output unit 27 under the control of the information presentation integration control unit 61 shown in FIG. 4 when the serial timer record setting input unit 81 shown in FIG. 5 executes the process of inputting the serial timer record setting as shown in FIG. 6.

Referring to the image representing the serial timer record setting in FIG. 6, a top pull-down menu 101 is used for selecting one of a plurality of content recording units 13, which is subjected to setting. In the embodiment of the invention, the pull-down menu 101 allows the user to select one of the content recording units 13A and 13B shown in FIG. 1. For example, in FIG. 6, the content recording unit 13A is selected.

The pull-down menu 101 displays the "content recording unit 13A" in FIG. 6. Actually, the description of the unit subjected to the setting, for example, the DVD called "ODOROKU 1234" is displayed. This makes it possible to notify the user with respect to the unit that has been currently set (selected by the user) definitely.

At a start-up timing, that is, immediately after the start of the process of serial timer record setting executed by the serial timer record setting input unit 81, the pull-down menu 101 displays a predetermined one of the content recording units 13 by default.

Three pull-down menus 102-1 to 102-3 are provided below the pull-down menu 101 for selecting the channel. Each of the tuners 51-1 to 51-3 provided in the currently set unit shown in FIG. 3 (the content recording unit 13 currently displayed on the pull-down menu 101) is corresponded to each of the pull-down menus 102-1 to 102-3, respectively. Accordingly, each of the respective pull-down menus 102-1 to 102-3 is used-for selecting the channel corresponding to the tuners 51-1 to 51-3, respectively.

Referring to FIG. 6, channels A, B and C are set as being corresponded to the tuners 51-1, 51-2, and 51-3, respectively as indicated by the image of the pull-down menus 102-1 to 102-3.

Upon start-up, each of the pull-down menus 102-1 to 102-3 displays the name of the channel that has been currently set by default.

Displayed below the pull-down menu 102-1 is a table (hereinafter referred to as a time table) that shows the input mode of the serial timer record setting of the channel shown in the pull-down menu 102-1, that is, the channel corresponding to the tuner 51-1 (the channel A in FIG. 6).

In the example shown in FIG. 6, the time table has lateral sections (hereinafter referred to as the horizontal axis) of day (Monday=M, Tuesday=T, Wednesday=W, Thursday=T, Friday=F, Saturday=S, and Sunday=S), and longitudinal sections with which the time is assigned (hereinafter referred to as a vertical axis; from 4 a.m. to the next 4 a.m. for 24 hours shown in FIG. 6).

An area 104 filled in a predetermined color (gray in FIG. 6) of the entire area constituting the time table represents the serial timer record setting that has been already input. The area 104 corresponding to the time slot including the day in which the timer record setting has been already input is displayed in the form different from that of the other area (the respective sections specified by the day and time). For example, referring to FIG. 6, the area 104 is displayed to be filled in gray color, while keeping other areas filled in white color.

Looking at the gray area 104, the user is able to easily confirm that the serial timer record setting to "record the content (program) delivered from the channel A in the time slot between 6 p.m. and 0 a.m. from every Monday to Saturday" has been input.

Likewise, displayed below the pull-down menu 102-2 is the time table that shows the input mode of the serial timer record setting of the channel shown in the pull-down menu 102-2, that is, the channel corresponding to the tuner 51-2 (the channel B in FIG. 6).

The gray areas 105 and 106 of all the area constituting the time table represent the serial timer record setting that has been already input. Looking at the gray area 105, the user is able to easily confirm that the serial timer record setting to "record the content (program) delivered from the channel B in the time slot between 6 a.m. and 7 a.m. from every Monday to Friday" has been input. Looking at the gray area 106, the user is able to easily confirm that the serial timer record setting to "record the content (program) delivered from the channel B in the time slot between noon and 4 p.m. on every Monday" has been input.

Likewise, displayed below the pull-down menu 102-3 is the time table that shows the input mode of the serial timer record setting of the channel shown in the pull-down menu 102-3, that is, the channel corresponding to the tuner 51-3 (the channel C in FIG. 6)

The gray areas 107 to 109 of all the area constituting the time table represent the serial timer record setting that has been input. Looking at the gray areas 107 to 109, the user is able to easily confirm that a plurality of serial timer record settings to "record the content (program) delivered from the channel C in the time slot between 8 a.m. and 10 a.m. every Monday to Friday", "record the content (program) delivered from the channel C in the time slot between 10 a.m. and 2 p.m. every Sunday", and "record the content (program) delivered from the channel C in the time slot between 6 p.m. and 0 at midnight on every Monday to Sunday" have been input, respectively.

Displayed below those three time tables is an area 110 that includes an input box, a pull-down menu and the like for a new serial timer record setting (hereinafter referred to as a new timer record setting) including setting operations (setting of channel, day, and time slot), and updating the content of the serial timer record setting that has been input (channel, day and time slot).

Displayed below the area 110 are four soft buttons 111 to 114.

The soft buttons 111 to 114 will be referred to as a new button 111, an OK button 112, an erase button 113, and a help button 114,-respectively. Other soft buttons shown in FIGS. 7 and 8 will also be referred to as the same descriptions.

Referring to the example of FIG. 6, the OK and the erase buttons 111 and 113 are shown by the dashed line, indicating that those buttons is unavailable to be depressed at the time as shown in FIG. 6.

Detailed explanation with respect to the area 110, and the new button 111 to the help button 114 will be described later.

The user is allowed to operate a new setting of the serial timer record using the serial timer record setting image shown in FIG. 6 as described below.

The operation of the serial timer record setting image as the example shown in FIG. 6 will be described on the assumption that the mouse is selected among the input units 26 for the explanatory purposes. It is to be understood that the user is allowed to operate the new timer record setting through the process that is the same as (or similar to) the operation which will be described below even if the user uses the other input unit 26, for example, a remote controller and the like.

In the state where the serial timer record setting image is displayed on the output unit 27 as shown in FIG. 6, if the operation for locating a mouse pointer of a mouse (not shown) at the new button 111, and clicking (hereinafter simply referred to as a press-down operation) is performed, that is, the new button 111 is pressed down, the channel that is currently selected is identified in the channel box in the area 110, while other boxes and pull-down menus being kept blank.

The process of selecting the channel is not specifically limited, and this embodiment assumes to use a method wherein the user moves the mouse pointer to be located at an arbitrary position of the time table downward of the pull-down menu among those of 102-1 to 102-3, on which the desired channel is displayed, and then the user clicks for selecting such channel.

For example, when the mouse pointer is located at the point within the time table downward of the pull down menu 102-1 and clicked, the channel A is supposed to be selected. In this instance, as shown in FIG. 6, the "channel A" is displayed in the area 110.

The user then moves the mouse to operate the pull-down menu rightward of the "timer record setting period" display for selecting the "time slot (between start time and finish time)" of the new timer record setting. The user operates the mouse to check at least one box from Monday through Sunday downward of the pull-down menus for selecting the "day" in the new timer record setting. The user further operates the mouse to use the pull-down menu rightward of the "record mode" display downward of the above-described check boxes for selecting the "record mode" of the new timer record setting. The record mode includes a standard mode, long mode, and the like for setting the image quality and audio quality as described above.

The user moves the mouse pointer to the point in the time table corresponding to the required channel, and clicks so as to update the "channel" of the new timer record setting.

The content of the new timer record setting is automatically displayed (produced by the timer record setting input unit 62) in the box rightward of the "video capsule" display in the area 110. The displayed content becomes the title of the video capsule set to be recorded in accordance with the content of the new timer record setting. The user is allowed to change the content input to the box, that is, the title of the video capsule.

Specifically, assuming that the user intends to set (input) the timer record setting to "record the content (program) delivered from the channel A in the time slot between 6 a.m. and 10 a.m. on every Monday to Friday", the user operates the mouse to input necessary information in the respective boxes and the pull-down menus in the area 110.

In response to the press-down operation of the OK button 112, the timer record setting input unit 62 determines that execution of the new timer record setting is commanded, and recognizes the content displayed on the area 110 as the authorized setting information.

If it is determined that there is no problem in the content of the recognized setting information, the timer record setting input unit 62 generates the serial timer record setting (data) to which the gray area indicating the new timer record setting is added. That is, the timer record setting input unit 62 updates the serial timer record setting image.

The updated serial timer record setting image is supplied from the timer record setting input unit 62 to the information presentation integration control unit 61 so as to be displayed on the output unit 27. In this case, the serial timer record setting image (not shown) having lateral sections from "M" to "F" and longitudinal sections from "6" to "10" in the time table below the pull-down menu 102-1 as shown in FIG. 6 is newly added with the gray area, which will be displayed on the output unit 27.

Looking at the newly added gray area, the user is able to easily confirm the content of the new timer record setting. That is, the user is able to easily confirm that the serial timer record setting to "record the content (program) delivered from the channel A in the time slot between 6 a.m. and 10 a.m. on every Monday to Friday" has been input (already set).

In the example, "the process of inputting individual items in the area 110 and pressing down the OK button 112 after pressing down the new button 111" has been described as the exemplary operation for new serial timer record setting.

The operation for the new timer record setting is not limited to the above-described example, and various types of operation may be employed.

In the embodiment, when the mouse pointer is located to a point in one of the gray areas representing the serial timer record setting which has been already input (areas 104 to 109 shown in FIG. 6), and clicked, the content of the serial timer record setting indicated by the gray area to which the mouse pointer is located is displayed on the area 110. The erase button 113 is then enabled to be pressed down.

The user is allowed to locate the mouse pointer at the point in the gray area indicating that the serial timer record setting has been input, and click for the purpose of updating the content of the serial timer record setting that has been already input or erasing the serial timer record setting. The user updates the content displayed on the area 110 so as to update the content of the serial timer record setting, and presses down the erasure button 113 so as to erase the serial timer record setting.

The help button 114 is a soft button operated for displaying the help menu.

The operations required for the user to set and input the serial timer record setting has been described referring to FIG. 6.

The serial timer record setting image is not limited to the exemplary screen image shown in FIG. 6, but may take various forms. The description about the other example of the serial timer record setting image is omitted for convenience of explanation. However, Japanese Patent Application No. 2004-138593 filed by the inventor of the invention may serve as a useful reference.

Figure 8:
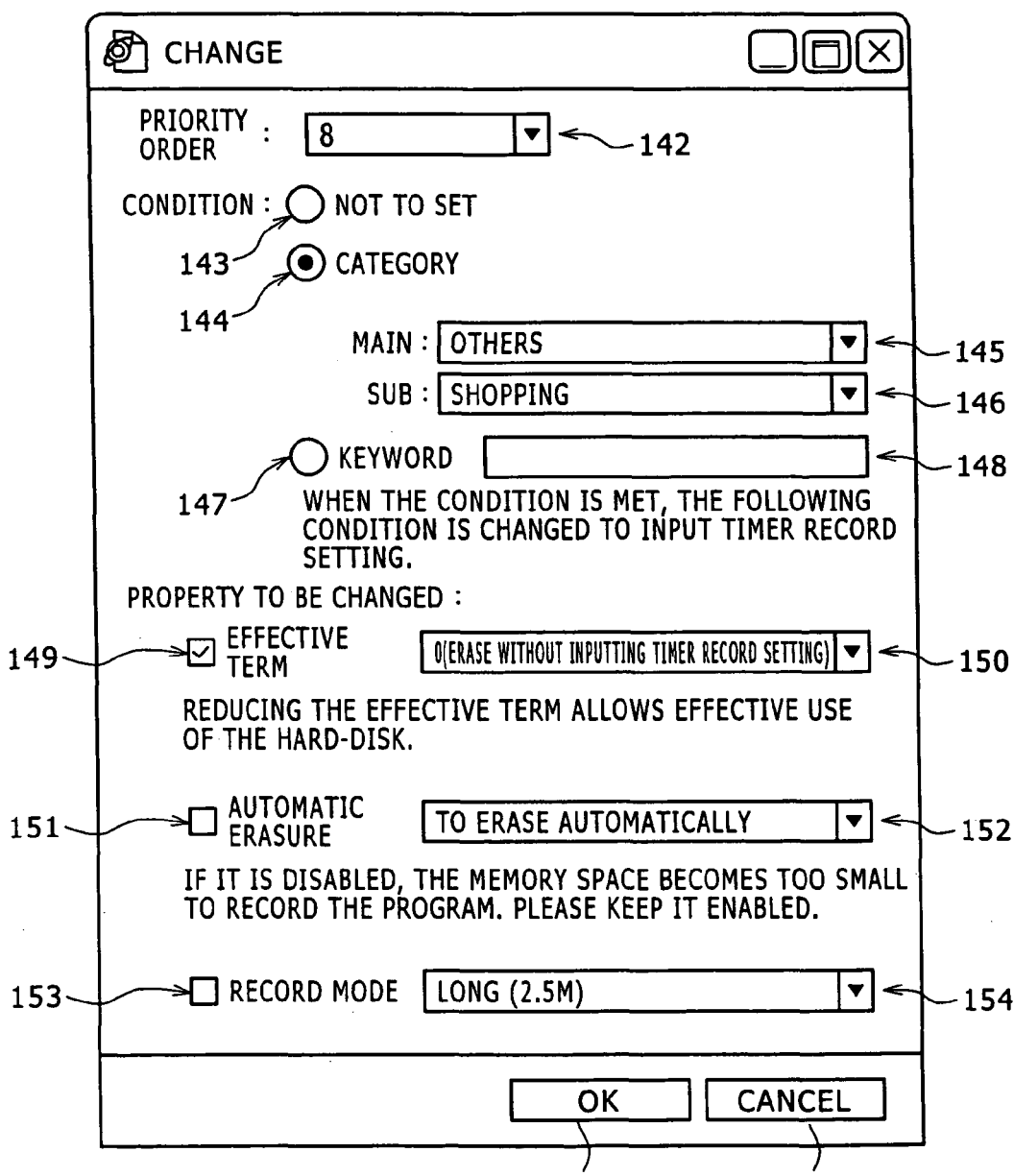
FIG. 8 is a view of an exemplary display for setting the timer set property change information used for the process executed by the setting unit shown in FIG. 4.

Operations required for the user to generate the timer set property change information data will be described referring to FIGS. 7 and 8. FIGS. 7 and 8 each represent an example of the image for setting the timer set property change information data output through (displayed on) the output unit 27 under the control of the information presentation integration control unit 61 when the setting unit 64 shown in FIG. 4 is operated to set (generate) the timer set property change information data.

Referring to an image 121 for setting the timer set property change information data as the example shown in FIG. 7, a display field 131 is provided below the messages at the top initiating from the "setting timer set property change --- the record mode of the news can be designated to normal". The display field 131 displays the list of the respective timer set property change information data currently stored in the timer set property change information storage unit 63.

Each line of the display field 131 corresponds to a single piece of the timer set property change information data. In the embodiment, the timer set property change information data include a priority order (the leftmost numeral in each line of the display field 131), type, condition, timer set property to be changed, and the content thereof, which will be collectively referred to as the property to be changed.

The explanation of the priority order will be described later.

The type is used as the condition (later described), which may be divided into "keyword" and "category" in the embodiment of the invention.

The "keyword" (a symbol row) set as the type serves as the condition. The keyword (a symbol row) as the condition may be arbitrarily set by the user as described later. In the case of the timer set property change information data while the "keyword" being set as the type, a predetermined timer set property of the program including the keyword (a symbol row) set as the condition is changed in accordance with the content of the property to be changed as described later.

Meanwhile, the "category" set as the type serves as the condition, which is selected among a plurality of categories defined in the program information. The "category" includes "main" and "sub" in the embodiment. Specifically, in the embodiment, the "main" category includes "foreign movie", "Japanese movie", "sport 1", "sport 2", "music", "drama/theater", "news/report", "variety", "documentary", "leisure/hobby", "children/education", "culture/documentary", "foreign program", "adult", "digital radio", "others", and "recommended program" which are preliminarily set as well as undefined category for the use in future. In case of the timer set property change information data while the "category" being set as the type, a predetermined timer set property in the program including the category set as the condition as the program information data is changed in accordance with the content of the property to be changed (later described).

The property to be changed refers to the information including the timer set property to be changed, and the content in the change of thee timer set property.

For example, three timer set properties to be changed are set in the embodiment as described below.

The "effective term" is the first timer set property to be changed. The "effective term" is the length of time for which the recorded program (video capsule) is held stored in the HDD 46A or 46B as shown in FIG. 4. In other words, if the "effective term" expires, the recorded program (video capsule) is subjected to the process "to automatically erase" to be described later.

The "effective term" may be selected from twelve patterns in total including "0 (timer record setting is not input, and accordingly, the program is not stored in the HDD 46A or 46B)", "one day" to "six days", and "one week" to "4 weeks". The "one day" is set by default.

"To erase automatically" is the second timer set property to be changed. The "to erase automatically" represents that when the recordable memory space (residual memory) of the HDD 46A or 46B becomes a predetermined threshold value or less, the recording management unit 71A or 71B determines the recorded program to be erased in accordance with the rule as described below, and the determined programs are automatically erased from the HDD 46A or 46B until the residual memory exceeds the predetermined threshold value.

The rule for performing "to erase automatically" will be described hereinafter. The embodiment employs following conditions (a) to (e). The order of those conditions (a) to (e) is defined by the priority. Upon execution "to erase automatically", those conditions are applied in the order from (a) to (e). The recorded programs to be erased will be sequentially erased until the recordable memory space (residual space) of the HDD 46A or 46B exceeds the predetermined threshold level.

Condition (a): The recorded program protected by folding the pawl is never erased irrespective of the other state.

The term "protected" represents the concept corresponding to the protection of the data recorded in the video tape by folding the pawl thereof in the hardware. In this case, there are tow properties, one is the state where "the pawl has been folded", and the other is the state where "the pawl is not folded". Accordingly, no one can erase the recorded program exhibiting the property in which "the pawl is folded". For example, the property in which "the pawl is folded" may be set for the purpose of preserving the program for an elongated time using the image for GUI (not shown) by the user. The property in which "the pawl is not folded" may be set for the purpose of erasing the recorded program using the image for GUI.

Condition (b): The recorded program which is set "not to erase automatically" cannot be erased.

Condition (c) : If the recorded program is set "to erase automatically", and has the "effective term" expired (elapsed), it will be erased.

The recorded program having the "effective period" expired may be erased even if the recordable memory (residual memory space) of the HDD 46A or 46B exceeds the threshold level. If the residual memory is insufficient, the recorded program which is set to be "automatically erased" and satisfies the condition (c), that is, the program having the "effective period" expired is first erased.

Condition (d): The recorded programs which are set to be "automatically erased", and never have the "effective term" set are sequentially erased in the chronological order of the time at which the program has started.

Condition (e): The recorded programs which are set to be "automatically erased", and have the "effective term" not expired yet are sequentially erased in the chronological order of the time at which the program has started.

The "automatic erasure" as the second timer set property, thus, includes operations to "to erase automatically" and "not to erase automatically" which are defined by the aforementioned conditions so as to be selected. By default, "to erase automatically" is set.

The "record mode" is the third timer set property to be changed. The "record mode" is used for setting the image quality or audio quality as described above.

The "record mode" includes such modes as "high definition", "normal (4M)", "long (2.5M)", and "long (1.25M)". By default, the mode is set to "long (2.5 M)".

Specifically, the timer set property change information on the first line from the top of the display area 131 (except the line on which the "type", "condition", "property to be changed" are displayed), that is, the one with the 1st priority order has the "keyword" set as the type. When the program that contains the program information of "world heritage" as the keyword is input, the timer set property of the "automatic erasure" has been changed "not to erase automatically", and the timer set property of the "record mode" has-been changed to "normal (4M)".

The timer set property change information on the ninth line from the top in the display area 131 represents the one having the "category" set as the type. In the case where the program that contains the program information of "documentary" as the category is input, the timer set property change information has the timer set property of the "effective term" changed to "0".

If a predetermined program is intended to be subjected to the input of the timer record setting, it is determined whether such program satisfies conditions of the respective timer set property change information data displayed in the display area 131 sequentially in the priority order. The predetermined timer set property in the program subjected to the input of the timer record setting will be changed in accordance with the property to be changed of the timer set property change information with the highest priority order among those for satisfying the condition.

In the case where a first program having the "world heritage" and "documentary (category)" contained in the program information data is subjected to the timer record setting, the "automatic erasure" and the "record mode" as the timer set properties are changed "not to automatically erase" and "normal (4M)", respectively so as to satisfy the condition of the timer set property change information with the 1st priority order. In this case, the first program satisfies the condition of the timer set property change information with the 9th priority order. Since the timer set priority change information with the 1st priority has been applied to change the timer set property, the one with the 9th priority order is not applied. That is, the "effective term" of the first program is not changed to "0", and as a result, the timer record setting of the first program is input so as to be recorded in the HDD 46A or 46B.

Meanwhile, in the case where the second program having the "documentary (category)" contained but "world heritage" not contained in the program information is subjected to the input of the timer record setting, the condition of the timer set property change information with the 1st priority order is not met, which is not applied. If it is determined that the second program fails to satisfy conditions of the timer set property change information with the 2nd to the 8th priority orders, it is determined to satisfy the condition of such information with the 9th priority order, which is applied. The "effective term" of the second program is changed to "0", and as a result, the timer record setting of the second program is not input so as not to be recorded in the HDD 46A nor 46B.

Basically, the program categorized as "documentary" is not subjected to the input of the timer record setting, in other words, not recorded in the HDD 46A or 46B in accordance with the timer set property change information having the condition of the "documentary". If the user requires to record the program categorized as the "documentary", the timer set property change information is produced to include the keyword corresponding to the user's request.(for example, "world heritage"), and the priority order of the timer set property information is made higher than the one including the "documentary (category)" with the 9th priority order, for example. The user is allowed to input the timer record setting of the required program reliably, and as a result, such program may be recorded in the HDD 46A or 46B.

Referring to FIG. 7, the condition of the timer set property change information with the 7th priority order, "no program information" represents the portion of the timer record setting of the above-described serial timer record setting in the time slot for which no program is broadcasted (time range between midnight and early morning). The timer set property change information with the 7th priority order is the one produced for inhibiting input of the timer record setting in the time slot for which no program is broadcasted. The "effective term" as the property to be changed is set to "0".

TOP button 132, DOWN button 133, change button 134, and erase button 135 as soft buttons are provided below the display area 131 that displays the list of the timer set property change information for newly registering the timer set property change information (new storage to the timer set property change information storage unit 63 shown in FIG. 4), changing and erasing the content of the timer set property change information data that have been already registered.

The user is allowed to newly register the timer set property change information, change and erase the content of the timer set property change information data that have been already registered by performing a predetermined operation, that is, pressing down of those buttons 132 to 135. An example of the predetermined operation will be described.

The operations in the example shown in FIG. 7 and the operations with respect to the image for setting the timer set property change information of the example shown in FIG. 8 to be later described will be explained on the assumption that the mouse is employed as the input unit 26 shown in FIG. 4 for convenience of explanation. It is to be understood that the user is allowed to newly register the timer set property change information, change and erase the content of the timer set property change information data that have been already registered through the identical operation as described below or similar thereto even if a remote control as the input unit 26 is employed.

In the display area 131, the line that displays the timer set property change information selected as the one to be newly added, intended to have its content changed, or erased will be highlighted. Hereinafter, the highlighted timer set property change information will be referred to as the selected timer set property change information. The selected timer set property change information as shown in the 10th line of the display area 131 shown in FIG. 7 does not have any particular information, and therefoee "unset" is displayed on such line. The timer set property change information may be newly registered by highlighting the line that displays "unset" so as-to be changed to the selected timer set property change information.

The user is allowed to freely change the selected timer set property change information by depressing the "UP" button 132 or the "DOWN" button 133. Specifically, as the user depresses the "UP" button 132 once, the selected timer set property change information (highlighted) moves up line by line sequentially in the display area 131. Meanwhile, as the user depresses the "DOWN" button 133 once, the selected timer set property change information (highlighted) moves down line by line sequentially in the display area 131.

The user is allowed to set a predetermined timer set property change information (on the predetermined line in the display area 131) as the selected timer set property change information by pressing down the "UP" button 132 or the "DOWN" button 133. The user is allowed to change the content of the selected timer set property change information data by depressing the CHANGE button 134. The change in the content of the selected timer set property change information includes not only updating of the content that has been already set but also new registration of the timer set property change information. In the example shown in FIG. 7, the 10th line that displays "unset" in the display area 131 is highlighted to be set as the selected timer set property change information. In this state, the user is allowed to newly add the property change information by depressing the CHANGE button 134.

In the embodiment, when the user depresses the CHANGE button 134, the setting unit 64 shown in FIG. 4 outputs (displays) the image for setting the timer set property change information shown in FIG. 8 via the information presentation integration control unit 61 from the output unit 27. FIG. 8 shows an example of the image for setting the timer set property change information for making various settings of the selected timer set property change information.

Referring to an image 141 for setting the timer set property change information of the example shown in FIG. 8, a top pull-down menu 142 is used for selecting the priority order of the selected timer set property change information. In the example, the priority order may be selected between 1 and 20 as shown, in the display area 131 of FIG. 7 by selecting the number corresponding: to the priority order from the pull-down menu 142.

In the example shown in FIG. 8, the number 8 is selected from the pull-down menu 142, that is, the priority order is selected to the 8th. In this case, the content of the display in the display area 131 shown in FIG. 7 is shown on the 8th line as the selected timer set property change information, and the rest of the timer set property change information data move up or down line by line so as to be displayed. In the case where the original priority order of the timer set property change information, that is, 4th is changed to 8th, the original order (1, 2, 3, 4, 5, 6, 7, 8, 9 . . . ) will be changed to the order (1, 2, 3, 5, 6, 7, 8, 4, 9, ...). The display in the display area 131 shown in FIG. 7 will be updated accordingly.

Check boxes 143, 144, and 147 are provided below the pull-down menu 142 for selecting the type of the condition of the selected timer set property change information data.

If the check box 143 is checked (selected), the condition for the selected timer set property change information will not be changed.

If the check box 143 is checked (selected), the "category" is set (used) as the type of the condition for the selected timer set property change information. In this case, the user is allowed to operate pull-down menus 145 and 146 to the right of the screen image. The user selects the "main" category from the pull-down menu 145, and the "sub" category from the pull-down menu 146. In the example shown in FIG. 8, "Others" is selected from the "main" pull-down menu 145, and "Shopping" is selected from the "sub" pull-down menu 146, respectively, which are set as the respective conditions.

When the check box 147 is checked (selected), "keyword" will be set (used) as the type of the condition of the selected timer set property change information. In this case, a text input box 148 to the right of the screen display is enabled. The user is allowed to input a required keyword ("world heritage" or "chatting" as shown in FIG. 7) in the text input box 148 through the input unit 27 shown in FIG. 4, for example. In the embodiment, the word having up to 16 Chinese characters may be input into the text input box 148. By default, the null character sequence is displayed (no symbol is displayed).

Check boxes 149, 151, and 153 are provided below the checkbox 147 for setting the property to be changed.

When the check box 149 is checked (selected), the "effective term" is set (employed) as the timer set property to be changed. In this case, a pull-down menu 150 to the right of the checkbox 149 is enabled. The pull-down menu 150 is used for selecting the above-described "effective term". Referring to the image of FIG. 8, "0 (to be erased without timer record setting)" is selected and set (employed) as the "effective term".

When the check box 151 is checked (selected), the "automatic erasure" is set (employed) as the timer set property to be changed. In this case, a pull-down menu 152 to the right of the check box 151 is enabled. The pull-down menu 152 is used for selecting the above-described "automatic erasure". Referring to the image of FIG. 8, the checkbox 151 is not checked, and accordingly the "automatic erasure" is displayed by default.

When the checkbox 153 is checked (selected), the "record mode" is set (employed) as the timer set property to be changed. In this case, a pull-down menu 154 to the right of the checkbox 153 is enabled. The pull-down menu 154 is used for selecting the above-described type of the "record mode". Referring to the image of FIG. 8, the checkbox 153 is not checked, and accordingly the "long (2.5 M)" is set by default.

As the checkboxes 149, 151, and 153 are operated independently, at least one of those checkboxes may be checked (selected) simultaneously.

An OK button 155 as a soft button is depressed by the user for settling various settings as described above. When the user depresses the OK button 155, the setting unit 64 determines that the setting of the selected timer set property change information has been settled, and further recognizes that the content of the image 141 for setting the timer set property change information as an authorized set information. If the setting unit 64 determines that the content of the recognized set information has no problem, new registration of the timer set property change information or updating of the content of the timer set property that has been already registered are performed in accordance with the content of the set information.

Assuming that the CHANGE button 134 is depressed in the state where the 10th line from the top of the display area 131 displays the selected timer set property change information in FIG. 7, and the OK button 155 is further depressed in the state where the screen image is displayed as shown in FIG. 8, the timer set property change information with the priority order set to 8th, type of the condition set to "category", the "main" category set to "Others", the "sub" category set to "shopping", and the property to be changed set to the "effective term set to 0" will be newly stored (newly added) in the timer set property change information storage unit 63 shown in FIG. 4.

The 8th line of the display area 131 displays such information as "8 Category Others Shopping Effective Term 0" (not shown), and the screen display will be updated such that the information displayed subsequent to the 8th line will shift down line by line.

A CANCEL button 156 as the soft button next to the OK button 155 is depressed by the user for canceling various settings as described above. When the user depresses the cancel button 156, the content of the displayed image 141 for setting the timer set property change information is brought into the default.

Referring to FIG. 7, the ERASE button 135 as the soft button is depressed for erasing the selected timer set property change information. When the user depresses the ERASE button 135, the selected timer set property change information is erased from the timer set property change information storage unit 63. The display content of the display area 131 (not shown) is erased from the selected timer set property change information (the 20th line displaying "unset"), and the screen image is updated by shifting up the timer set property change information with the subsequent priority orders line by line.

The user is allowed to freely set the timer set property change information with required priority order, required condition, and required property to be changed. The user is allowed to input so as not to send the timer record setting of a specific program (by changing the "effective term" to "0" in the embodiment). The user is further allowed to set so as to record the specific program at its image quality enhanced (by changing the "record mode" to "high definition"). The user is allowed to determine the erasure timing depending on the requirement of the user rather than erasing the recorded program in the chronological order. For example, the user is allowed to set such that the news show is erased after an elapse of a shorter period, and the user's favorite program is saved for a longer period in compliance with the user's demand (by setting to change the "automatic erasure" or the "effective term". The user is able to perform various settings freely.

In the embodiment of the invention, the user is able to perform setting of the timer set property change information (new addition, change or erasure of the content) freely. The timer record setting is input in accordance with the above-described setting. The resultant freedom degree of such setting with respect to the requirement of recording the program, and determination of the timing for erasing the program after recording, thus, may be enhanced.

An example of the operations to set the timer set property change information (new addition, change or erasure of the content) has been described. It is to be understood that the operation process is not limited to the example, but various types of the process may be employed.

The image for setting the timer set property change information is not limited to those shown in FIGS. 7 and 8, but may take various forms (not shown).

Referring to the flowchart of FIG. 9, an example of a "division timer record setting input process" executed by the division timer record setting input unit 82 of the timer record setting input unit 62 will be described hereinafter.

The division timer record setting input process will be described referring to FIGS. 10 to 15 for easy understanding. FIG. 10 is a graph showing an example of the program titles and the corresponding program information data. FIGS. 11 to 15 are charts each representing an example of the result of the "division timer record setting input process". More specifically, each of FIGS. 11 to 15 represents the program schedule of the channel A (table that displays the program to be on the air in the time slot between 6 and 21 (9 p.m.). A table that represents the content of the input of the timer record setting with respect to the channel A at a time point when a predetermined process of the "division timer record setting input process" has been finished (hereinafter referred to as a content of the timer record setting of the channel A).

Figure 11:
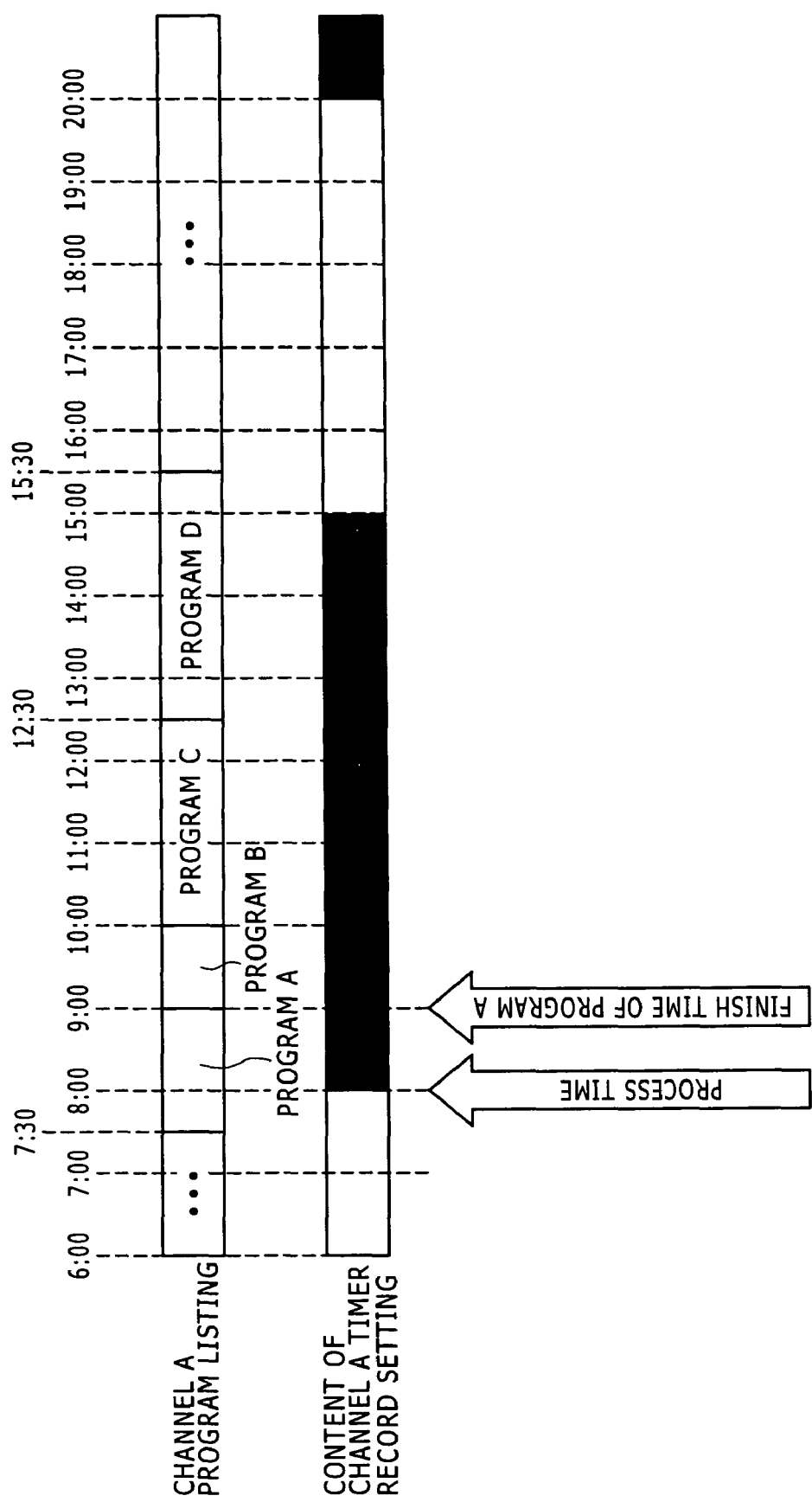
FIG. 11 is a chart that represents an example of the result of the "division timer record setting input process" shown in FIG. 9.

Referring to the content of the record setting of the channel A shown in FIG. 11, the serial timer record setting in the time slot between 8 and 15 (referred to as a first serial timer record setting), and the serial timer record setting in the time slot from 20 (referred to as a second serial timer record setting) are input.

Figure 9:
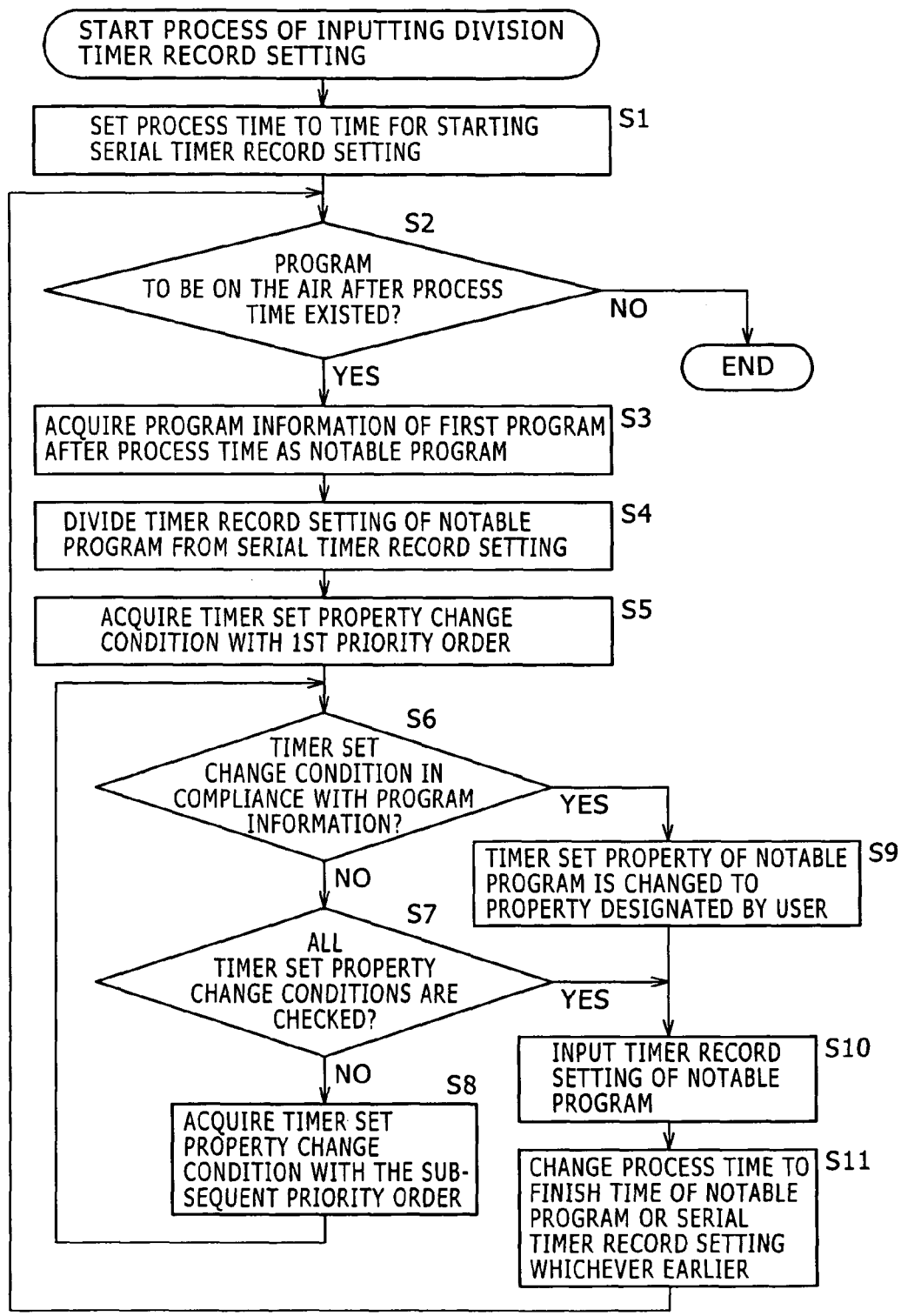
FIG. 9 is a flowchart that represents a "division timer record setting input process" executed by the content recording/reproducing device shown in FIG. 1.

The "division timer record setting input process" shown in the flowchart of FIG. 9 starts at a predetermined time point before 8 a.m. at which the first serial timer record setting starts.

In step S1, the division timer record setting input unit 82 sets the process time to 8 at which the first serial timer record setting starts.

In step S2, a program timer record setting division unit 91 of the division timer record setting input unit 82 determines whether there is a program to be on the air after the process time upon execution of the first serial timer record setting.

If it is determined that there is no program to be on the air after the process time in step S2, the "division timer record setting input process" ends.

Referring to the channel A program schedule shown in FIG. 11, programs A, B, and C are regarded as the program expected to be on the air after the process time. In this case, it is determined that the program to be on the air after the process time exists in step S2, and the process proceeds to step S3.

In step S3, the program timer record setting division unit 91 obtains the program information with respect to the first program after the process time as the notable program from a content/metadata supply unit 72. Referring to the channel A program schedule shown in FIG. 11, the program A is regarded as the notable program such-that the program information including "drama", "romance", "actor A", and the like as shown in FIG. 10 is acquired.

In the flowchart shown in FIG. 9, the process is divided into the steps S2 and S3. Actually, however, it may be executed without division. In this case, only when an arbitrary program information is supplied from the content/metadata supply unit 72, it is determined that there is the program to be on the air after the process time such that the process proceeds to step S4.

Figure 12:
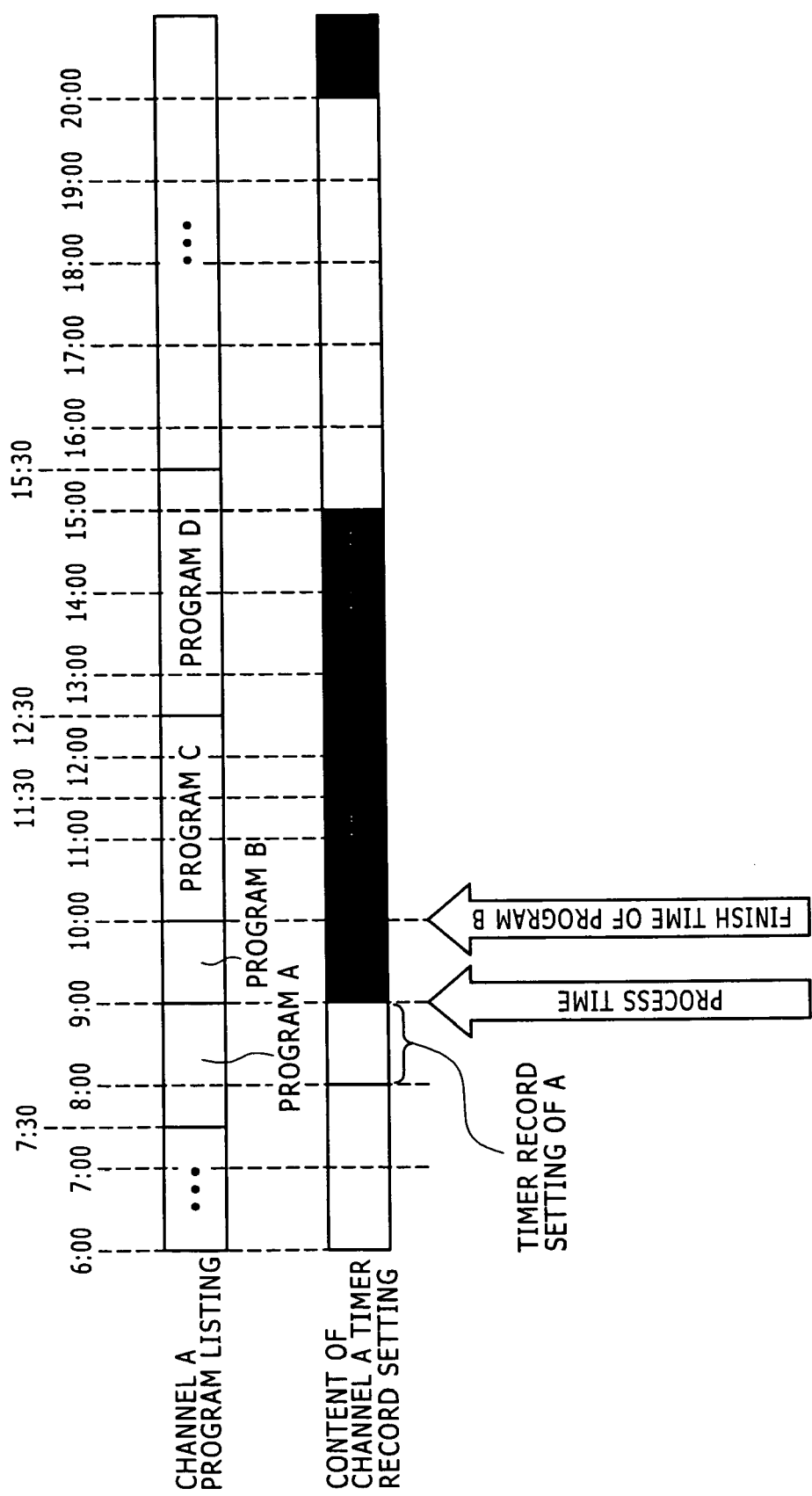
FIG. 12 is a chart that represents an example of the result of the "division timer record setting input process" shown in FIG. 9.

In step S4, the program timer record setting division unit 91 divides the timer record setting of the program A (hereinafter referred to as the timer record setting A) as the notable program from the first serial timer record setting as shown in FIGS. 11 and 12. When the timer record setting A is supplied from the program timer record setting division unit 91 to the timer set property change unit 92, the process proceeds to step S5.

In step S5, the timer set property change unit 92 obtains the condition of the timer set property change information with the 1st priority order (hereinafter referred to as the timer set property change condition) from the timer set property change information storage unit 63.

In the case where the timer set property change conditions with priority orders from the 1st to 9th (1st to 9th lines) displayed in the display area shown in FIG. 7 are stored in the timer set property change information storage unit 63, "world heritage (keyword)" is acquired as the timer set property change condition in step S5.

In step S6, the timer set property change unit 92 determines whether the timer set property change condition is in compliance with the program information.

Referring to FIG. 10, as the program information of the channel A does not include the "world heritage", it is determined that the timer set property change condition is not in compliance with the program information. The process then proceeds to step S7.

In step S7, the timer set property change unit 92 determines whether all the timer set property change conditions have been checked.

In the present case, as the timer set property change condition with the 1st priority order is only checked, it is determined that all the timer set property change conditions have not been checked in step S7, and the process proceeds to step S8.

In step S8, the timer set property change unit 92 acquires the timer set property change condition with the next priority order from the timer set property change information storage unit 63. The process returns to S6 for executing the subsequent process repeatedly.

In the present case, the "chatting (keyword)" as the timer set property change condition with the 2nd priority order is acquired in step S8. As the program information of the program A does not include the "chatting", NO is obtained in step S6. Then the "foreign movie" is acquired as the timer set property change condition with the 3rd priority order in step S8. The process is returned to step S6 for executing the subsequent process repeatedly.

Referring to the display area 131 shown in FIG. 7, the A program information does not include all the timer set property change conditions with the 1st to 9th priority orders. Accordingly NO is obtained in every determination with respect to the timer set property change conditions with the 1st to 9th priority orders in step S6. The loop process from steps S6 to S8 is repeatedly executed with respect to the timer set property change conditions with the 1st to 9th priority orders, respectively. In step S7, when it is determined that the timer set property change condition with the 9th priority order has been checked, the process proceeds to step S10 where the program A timer record setting (timer record wetting of the program A) is supplied from the timer set property change unit 92 to the timer record setting input unit 93 without changing the timer set property.

Then in step S10, the timer record setting input unit 93 inputs the timer record setting of the notable program, that is, the program A timer record setting to the recording management unit 71 as shown in FIG. 12.

In step S11, the division timer record setting input unit 82 changes the process time to the finish time of either the notable program or the serial timer record setting, whichever earlier. The process then returns to step: S2 for executing the subsequent process repeatedly.

Figure 13:
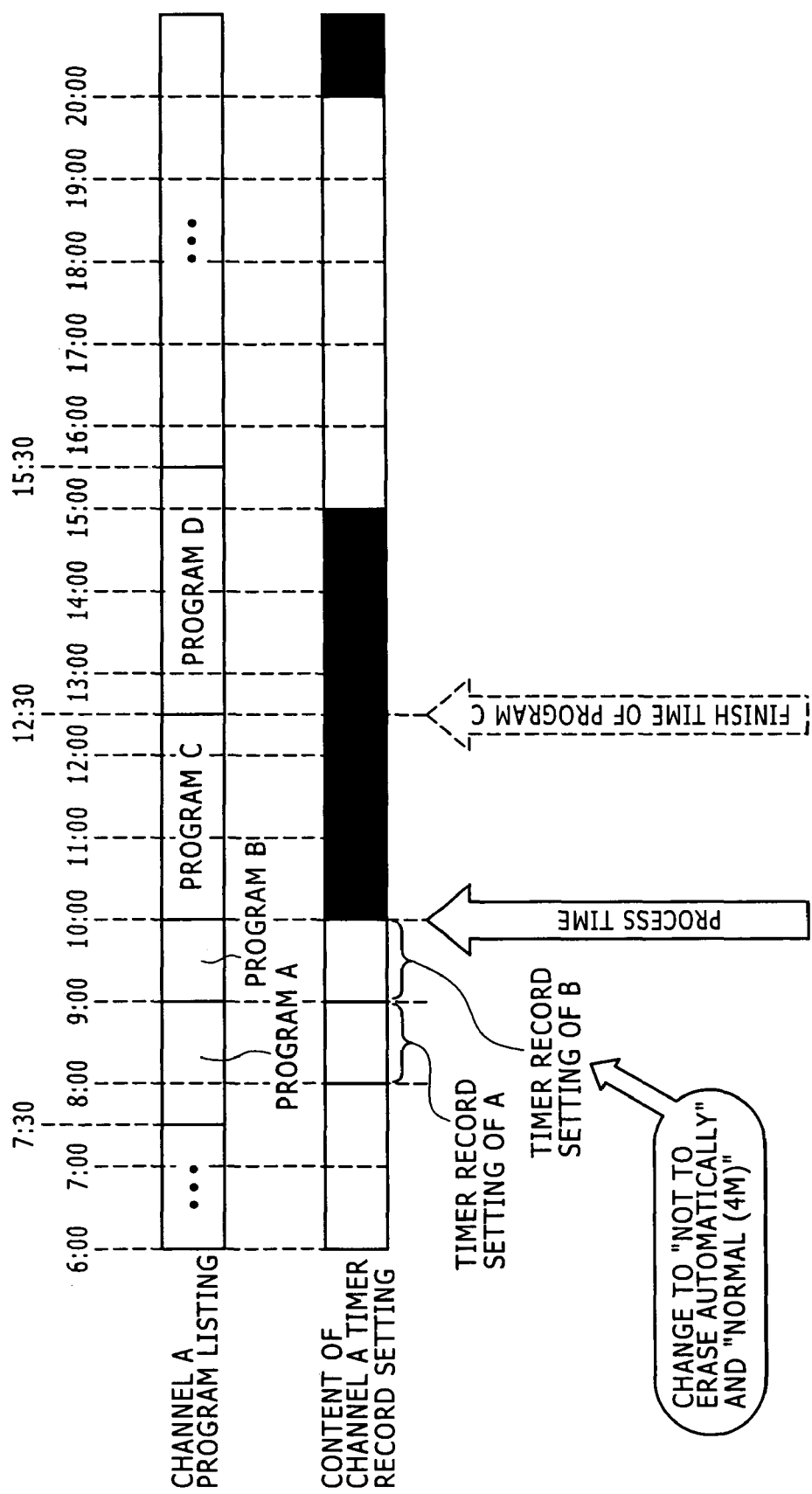
FIG. 13 is a chart that represents an example of the result of the "division timer record setting input process" shown in FIG. 9.

Referring to FIGS. 11 and 12, the process time is set to 9 as the finish time of the program A in step S11. In the case where YES is obtained in step S2, and the program B is set as the notable program in step S3, the program information including "documentary", "travel", "world heritage" and the like is acquired. Referring to FIGS. 12 and 13, the timer record setting of the program B as the notable program (hereinafter referred to as the program B timer record setting) is divided from the first serial timer record setting in step S4.

The process in step S5 and the loop process of steps S6 to S8 are executed repeatedly so as to make a determination whether the program information of the program B includes the timer set property change conditions with the 1st to 9th priority orders sequentially from the highest priority.

In the present case, the program B includes the "world heritage" as the timer set property change condition with the 1st priority order, YES is obtained in step S6 where the determination is made with respect to the timer set property change condition with the 1st priority order. The process then proceeds to step S9.

In step S9, the timer set property change unit 92 changes the timer set property of the notable program to the property designated by the user. More specifically, in accordance with the content of the property change of the timer set property change information with the 1st priority order as shown in FIG. 7, that is, "not to automatically erase, and normal 4 (M)", the "automatic erasure" and the "record mode" among the timer set properties of the program B as the notable program are changed "not to automatically erase" and "normal 4(M)", respectively.

In step S10, the program B timer record setting (timer record setting of the program B) having the timer set properties partially changed as described below is input to the recording management unit 71.

It is to be noted that even if the program B information includes the "documentary" as the timer set property change condition with the 9th priority order, YES has been obtained in step S6 where the determination is made with respect to the timer set property change condition with the 1st priority order, and the process proceeds to step S9. Accordingly the determination with respect to the "documentary" as the timer set property change condition with the 9th priority order in step S6 is not executed. In other words, the timer set property of the program B timer record setting is partially changed using the timer set property change information with the 1st priority order, the information with the priority order lower than the 1st priority order, for example, the 9th priority order, is not used. Generally, a predetermined timer set property of the notable program is changed using only the timer set property change information with the highest priority order among those having the timer set property change information included in the program information of the notable program, and the timer record setting of the notable program is input.

Referring to FIGS. 12 and 13, the process times is set to 10 as the finish time of the program B in step S11. In the case where YES is obtained in step S2, and the program C is set as the notable program instep S3, the program information including "foreign movie", "action", "actor B", and the like is acquired as shown in FIG. 10. The timer record setting of the program C (program C timer record setting) as the notable program is divided from the first serial timer record setting.

The process of step S5 and the loop process of steps S6 to S8 are repeatedly executed such that it is determined whether the program B includes the timer set property change conditions with the 1st to 9th priority orders one by one sequentially from the highest priority order.

As the C program information includes the "foreign movie" as the timer set property change condition with the 3rd priority order, YES is obtained in step S6 where the determination is made with respect to the timer set property change condition with the 3rd priority order. The program then proceeds to step S9.

Figure 14:
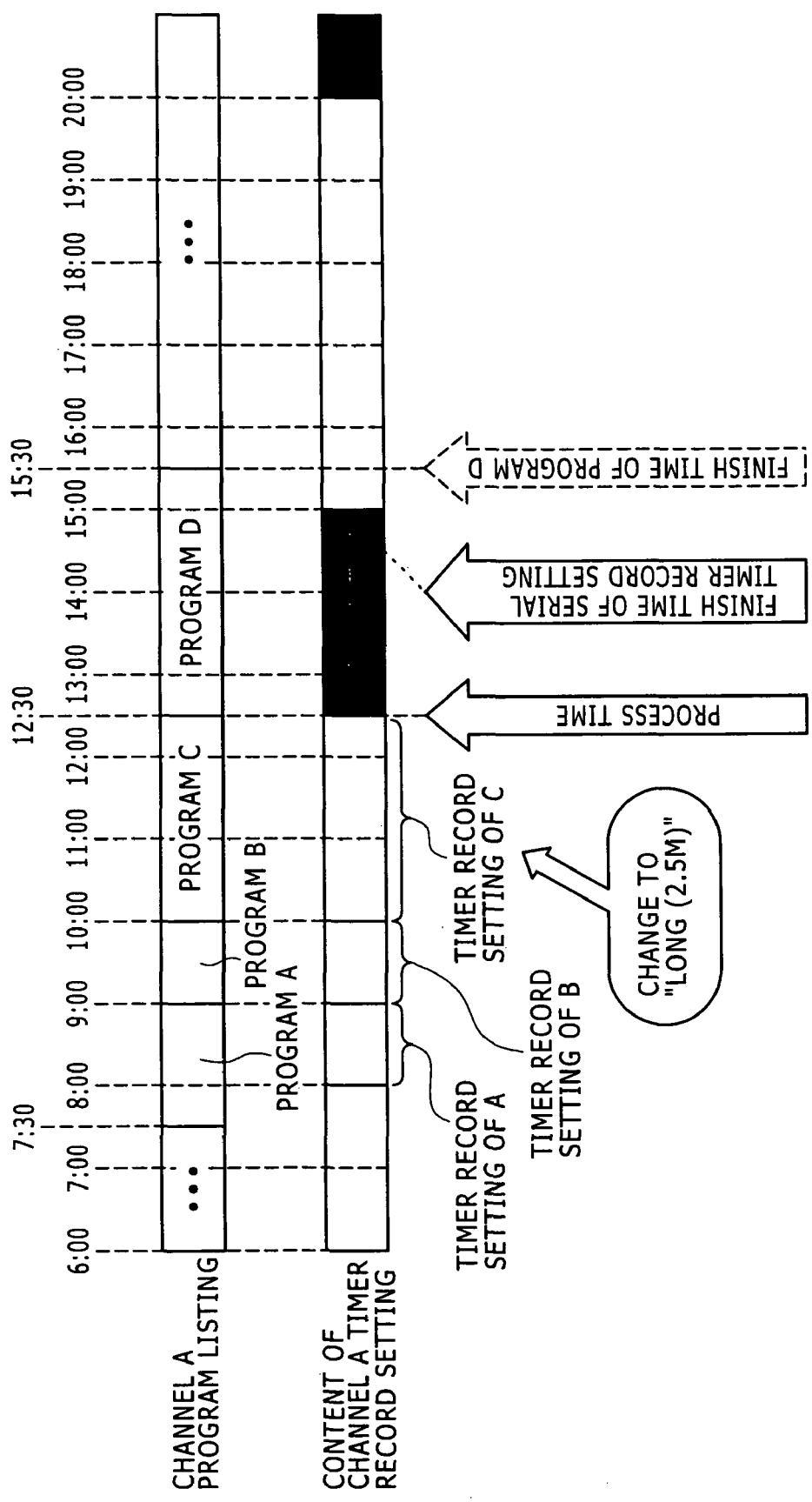
FIG. 14 is a chart that represents an example of the result of the "division timer record setting input process" shown in FIG. 9.

In step S9, the "record mode" as the timer set property of the program C as the notable program is changed to "long 2.5(M)" as shown in FIG. 14 in accordance with the content of the property change of the timer set property change information with the 3rd priority order as shown in FIG. 7.

Then in step S10, the program C (program C timer record setting) having the timer set properties partially changed is input to the recording management unit 71.

Referring to FIGS. 13 and 14, the process time is set to 12:30 as the finish time of the program C in step S11. In the case where YES is obtained in step S2, and the program D is set as the notable program, the program information including "documentary", "life", "big family", and the like is acquired as shown in FIG. 10. In step S4, the timer record setting of the program D as the notable program (hereinafter referred to as the program D timer record setting) is divided from the first serial timer record setting as shown in FIGS. 14 and 15.

The process in step S5 and the loop process from steps S6 to S8 are executed repeatedly such that it is determined whether the D program information includes the timer set property change conditions with the 1st to 9th priority orders one by one sequentially from the highest priority order.

As the program D information includes the "documentary" as the timer set property change condition with the 9th priority order, YES is obtained instep S6. The program, then proceeds to step S9.

Figure 15:
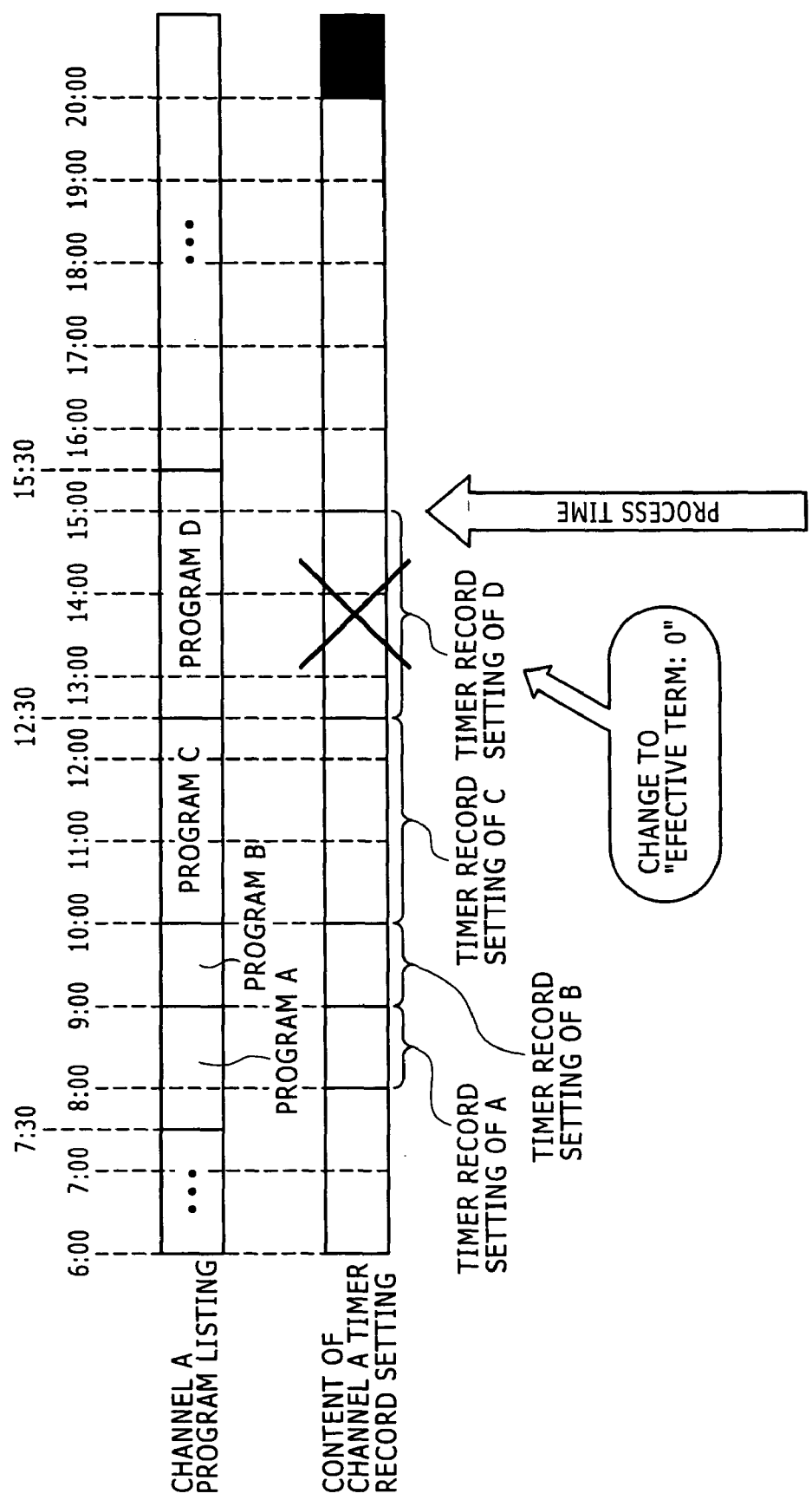
FIG. 15 is a chart that represents an example of the result of the "division timer record setting input process" shown in FIG. 9.

In step S9, the "effective term" of the timer set properties of the program D as the notable program shown in FIG. 15 is changed to "0" in accordance with the content of the property change of the timer set property change information with the 9th priority order, that is, "effective term set to 0".

When the "effective term" is changed to "0", the program D timer record setting (timer record setting of the program D) is not input to the recording management unit 71 in step S10 shown in FIG. 15. In other words, execution of the process in step S10 is inhibited, and the process proceeds to step S11.

Referring to FIGS. 14 and 15, the process times is set to 15 as the finish time of the first serial timer record setting instep S11. In the subsequent step S2, it is determined that there is no program to be on the air after the process time in the first serial timer record setting, and accordingly, the "division timer record setting input process" ends.

The "division timer record setting input process" is started again at a predetermined timing before 20 at which the subsequent second serial timer record setting starts.

An example of the "division timer record setting input process" and a more detailed example thereof (results of the process) have been described referring to the flowchart of FIG. 9, and FIGS. 10 to 15, respectively.

In the example, the division timer record setting input unit 62 for executing the "division timer record setting input process" is provided in the timer record setting input unit 62 of the main control unit 11. However, it is not limited to the example, but may be provided in the content recording unit 13A or 13B.

The "division timer record setting input process" is not limited to the example shown in FIG. 9 but various types of processing may be employed.

Referring to the chart of the channel A timer record schedule shown in FIG. 11; only a part of the program A is set to be timer recorded (the initial part of the program is not recorded). Basically, the serial timer record setting is input by the user. Specifically, it is designed to prioritize the private timer record setting based on the intention of the user. In the example of the "division timer record setting input process" as shown in FIG. 9, the program A timer record is set by prioritizing the starting time of the first serial timer record setting, that is, 8 over that of the program A, that is, 7:30.

In the example of the "division timer record setting input process" shown in FIG. 9, the program D timer record is set by prioritizing the finish time of the first serial timer record setting, that is, 15 over that of the program D, that is, 15:30. In other words, the program D timer record is set to record a part of the program D (last part cannot be recorded).

If the above-described prioritization is not required, the "division timer record setting input process" in which the starting time and the finish time of the broadcast program are prioritized may be employed. Assuming that such "division timer record setting input process" is performed, the program A timer record is set to "record the program A entirely, that is, to "record the content (program) delivered from the channel A in the time slot between 7:30 and 9". Likewise, the program D timer record is set to "record the program D entirely", that is, to "record the content (program) delivered from the channel A in the time slot between 12:30 and 15:30.

The "division timer record setting input process" is individually executed with respect to each of the tuners provided in the content recording/reproducing device 1 shown in FIG. 1. In the embodiment, the "division timer record setting input process" is individually (independently) executed with respect to the tuners 51-1A to 51-3A, and 51-1B to 51-3B provided in the content recording units 13A and 13B, respectively as shown in FIG. 3.

In accordance with the result of the "division timer record setting input process" individually executed for each of the tuners 51-1A to 51-3A, that is, each content of the input timer record setting, the recording management unit 71A of the content recording unit 13A shown in FIG. 4 controls the content acquiring unit 45A for recording the program in the HDD 46A. Video capsules that include compressed content data corresponding to the respective timer record settings are produced one by one so as to be accumulated (recorded) in the HDD 46A.

Likewise, in accordance with the result of the "division timer record setting input process" individually executed for each of the tuners 51-1B to 51-3B, that is, each content of the input timer record setting, the recording management unit 71B of the content recording unit 13B shown in FIG. 4 controls the content acquiring unit 45B for recording the program in the HDD 46B. Video capsules that include compressed content data corresponding to the respective timer record settings are produced one by one so as to be accumulated (recorded) in the HDD 46B.

A large amount of the thus produced video capsules are accumulated in the HDD 46A and 46B unless a particular measure is not taken. In the embodiment of the invention, the timer set property is changed, for example, changing the "effective term" to "0" so as to effectively use the recordable memory space of the HDD 46A and 46B. In other words, a certain program set in the serial timer record, which is not required by the user to be recorded is eliminated (recording is inhibited) through filtering set by the user, and the rest of the programs, that is, the program required by the user to be stored is recorded in the HDDs 46A and 46B under the conditions set by the user ("record mode", "automatic erasure", "effective term") rather than recording the program set in the serial timer record entirely in the HDD 46A or 46B.

Recently, as the recordable memory space of the HDD 46A or 46B has become considerably large, even if the number of programs to be recorded is narrowed down through the filtration, the user may feel difficulty in searching the required video capsule among a large number of data stored in the HDD. 46A and 46B unless an appropriate data management process is not employed, that is, a first problem occurs.

Even if the data recorded in the HDD 46A and 46B are managed based on the generally employed previous program schedule, the first problem may still occur. The generally employed previous program schedule is a mere table made on the basis of the program information of all the programs that have been on the air before, which represents all the programs (program list) irrespective of the fact whether each of those programs is actually recorded or not. It is difficult to tell the recorded program from the program that has not been recorded from the generally employed previous program schedule. Accordingly the first problem occurs, that is, it is considerably difficult for the user to search the required recorded program, thus causing the first problem All the programs shown on the generally employed previous program schedule cannot be reproduced, thus causing the second problem.

A technique for providing the recorded program among those shown on the previous program schedule with a predetermined mark, or changing the display form has been proposed for solving the second problem. This allows the distinction between the recorded program and the non-recorded program to a certain degree.

However, such technique may be used on the assumption that the generally employed previous program schedule on which all the programs on the air (the list that shows such programs) is used. The user has to locate the programs which are marked or displayed differently among all the programs on the schedule before selecting the desired program to be recorded. The technique that demands the troublesome operations will make the user feel difficulty in searching the required recorded program, failing to solve the first problem.

The aforementioned technique has the second problem that all the displayed programs cannot be reproduced.

In the embodiment, data (recorded programs) stored in the HDD 46A and 46B are managed in accordance with the previous program list that is different from the generally employed program schedule (hereinafter referred to as a previous program schedule according to the invention) so as to solve both the first and the second problems.

The previous program schedule according to the invention is formed of the program information of the recorded program contained in the video capsule that has been actually recorded, which will be described in detail referring to FIG. 16. The recorded programs (program listing indicating those programs) are only displayed such that all the displayed programs are reproduced. More correctly, the previous program schedule according to the invention shows the area that indicates the program that has not been recorded resulting from changing the "effective term" to "0", that is, an area 204 shown in FIG. 16. The program represented by such area, thus, cannot be reproduced.

Looking through the previous program schedule according to the invention, the user is allowed to easily search the required recorded program. Further the user is allowed to easily perform a commanding operation to reproduce the thus searched recorded program.

An example of the previous program schedule according to the invention is shown in FIG. 16. The example of the previous program schedule according to the invention will be described referring to FIG. 16.

The example of the previous program schedule in FIG. 16 shows the program section (display area) in the form similar to the TV listing on such medium as a newspaper. On the area 201, the program sections each showing the respective recorded programs by the channel are arranged and displayed in the area representing the recorded time slot. Each of the program sections is displayed having its length in the longitudinal direction corresponding to the time period taken for recording.

In each program section of the recorded program, an image (motion or still image) for thumbnail, and the title of the program are normally displayed. In the program section of the program having the short time taken for recording, display of the thumbnail may be omitted if needed because the length (size) of the program section corresponding to the recorded time slot is too short to display the thumbnail.

Referring to the example shown in FIG. 16, in the channel A section, the program section indicating the music program A recorded in the time slot between 20:05 and 20:50 and onward is displayed. This means that the music program A delivered from the channel A has been recorded in the aforementioned time slot. Meanwhile in the area representing the time slot between 19:30 and 20:05, the program section is not displayed. This means that the content (program) delivered from the channel A in the above time slot is not recorded.

Likewise, in the channel B section, the program section 202 as the music program B recorded in the time slot between 19:25 and 19:50, and the program section representing the information program A recorded in the time slot at a time point of 20 onward. In the respective time slots, the music program B and the information program A have been recorded in the aforementioned time slots. Meanwhile, as the program section is not displayed in the area that represents the time slot between 19:50 and 20. The content (program) delivered from the channel B in the above time slot is not recorded. The reason why the display form of the program section 202 is different from that of the other program section will be described later.

In the channel C section, the program section that represents the news program A that has been recorded in the time slot from a predetermined time point before 19:25 to 19:55. This means that the news program A delivered from the channel C has been recorded in the time slot. Meanwhile, the program section is not displayed on the area that represents the time slot between 19:55 and 20:50. It is to be understood that the content (program) delivered from the channel C in the above time slot is not recorded.

In the channel D section, the program section that represents the gymnastic program A that has been recorded in the time slot between 20:30 and 20:50 onward. This means that the gymnastic program A delivered from the channel D has been recorded in the above time slot. In the area that shows the time slot between 19:25 and 20:00, the program section is not displayed. This means that the content (program) delivered from the channel D in the time slot is not recorded. The filled area in black 204 will be described later.

In the channel E section, the program section that represents the weather program A that has been recorded in the time slot between 19:35 and 19:50. This means that the weather program A delivered from the channel E in the time slot has been recorded. Meanwhile, in the area corresponding to the time slot between 19:55 and 20:50, the program section is not displayed. The content (program) delivered from the channel E has not been recorded in the time slot.

In the area 201 as described above images of the program on the air or reproduced at present (hereinafter referred to as the background image) are displayed downward of the previous program schedule according to the invention including the program sections as described above. The background image is so controlled to be displayed only on the area on which the program section in the area 201 is not displayed (the area corresponding to the time slot having no program recorded) as shown in FIG. 16.

A program section 202 indicating the music program B delivered from the channel B is selected at present. In the case where the user is intended to command reproducing of the program (music program B in the example of FIG. 16), such program section is selected (designated) through operation of the input unit 26 shown in FIG. 4. In FIG. 16, the selected program section is displayed in gray color, which will be highlighted.

Various types of the information with respect to the program section 202 (corresponding recording program) will be displayed on the area 203 in need.

The program sections other than the selected program section 202 are not selected, which are displayed in white color as shown in FIG. 16. Actually it may be displayed translucently. In this case, unselected program sections are displayed transparently such that the background image (program on the air or reproduced at present) downward of the program section is displayed.

The program section 204 filled in black represents to have the timer set property of the program at least partially changed by the timer set property change unit 92 (hereinafter referred to as the timer set property change program section). The program having the "effective term" changed to "0" so as not to be recorded in the HDD 46A or 46B without inputting the timer record setting is displayed as being filled in black color.

When the user selects the timer set property change program section 204 through operation of the input unit 26 shown in FIG. 4, the information with respect to the title of the program, and indicating how the timer set property has been displayed in the timer set property change program section 204 or other area in the area 203 (not shown). "Other area" may be within the display area 201 shown in FIG. 16, or an area of the new area (not shown) independent from the previous program schedule (not shown). Alternatively, other information including the applied timer set property change information (content displayed on a predetermined line among those of the display area 131 as shown in FIG. 7) may be displayed.

Assuming that the generally employed previous program schedule includes the program that has not been recorded in the HDD 46A or 46B, this is attributed in the fact that the program has been erased as the user has already watched the program, or the timer record setting of the program has not been input owing to a predetermined condition. However, it is difficult to identify the specific reason why the program has not been recorded, thus causing the problem. In the embodiment of the invention, the aforementioned problem may be solved as the program section having the timer set property changed is displayed as the area filled in black.

The user is capable of selecting (mouseover) the timer set property change program section so as to identify such program or how the timer set property has been changed. As the change in the "effective term" to "0", for example, can be visually recognized, the user is allowed to confirm that the condition of "no timer record setting" of the program correctly works.

In the example, the timer set property change program section is displayed to be filled in black, which is not limited to the above-described form. An, arbitrary display form may be employed so long as such program section differs from the recorded program section (also differs from the selected program section nor un-selected program section).

The timer set property change program section may be enclosed with a red frame (not shown).

A predetermined symbol or icon may be displayed in the timer set property change program section so as to indicate the information that the timer set property has been at least partially changed by the user. The symbol or icon may be varied differently depending on the changed timer set property or the content of the change. Assuming that two cases exist, a first case where the "effective term" is changed to "0", that is, the program has not been recorded, and a second case where the program has been recorded while changing a predetermined timer set property, different symbols or icons may be used for the first and the second cases so as to be distinguished therebetween.

The use of the different symbols and icons makes it possible to display a first program section including the symbol or the icon indicating that recording has not been performed resulting from changing the "effective term" to "0", and a second program section including another type of symbol or icon indicating that the program has been recorded and erased thereafter simultaneously within the area 201 of the previous program schedule according to the invention. In this case, the user is allowed to easily distinguish the reason why the predetermined program has not been recorded in the HDD 46A or 46B, between the fact that the recording has not been performed and the fact that the program has been recorded and erased thereafter.

In the embodiment of the invention, the timer record setting of the program having the "effective term" changed to "0" is not input. However, the timer record setting of the program may be input so as to be recorded. In this case, the recorded program having the "effective term" changed to "0" is not displayed in the program section of the previous program schedule but may be made reproduced by performing the special operation. Preferably, from the view of the recordable memory space of the HDD 46A or 46B, the recorded program having the "effective term" changed to "0" is designed to be automatically erased preferentially after an elapse of a predetermined time period.

The content recording/reproducing device 1 to which the invention is applied has been described.

The invention may take various forms without being limited to the example shown in FIG. 1.

Figure 17:
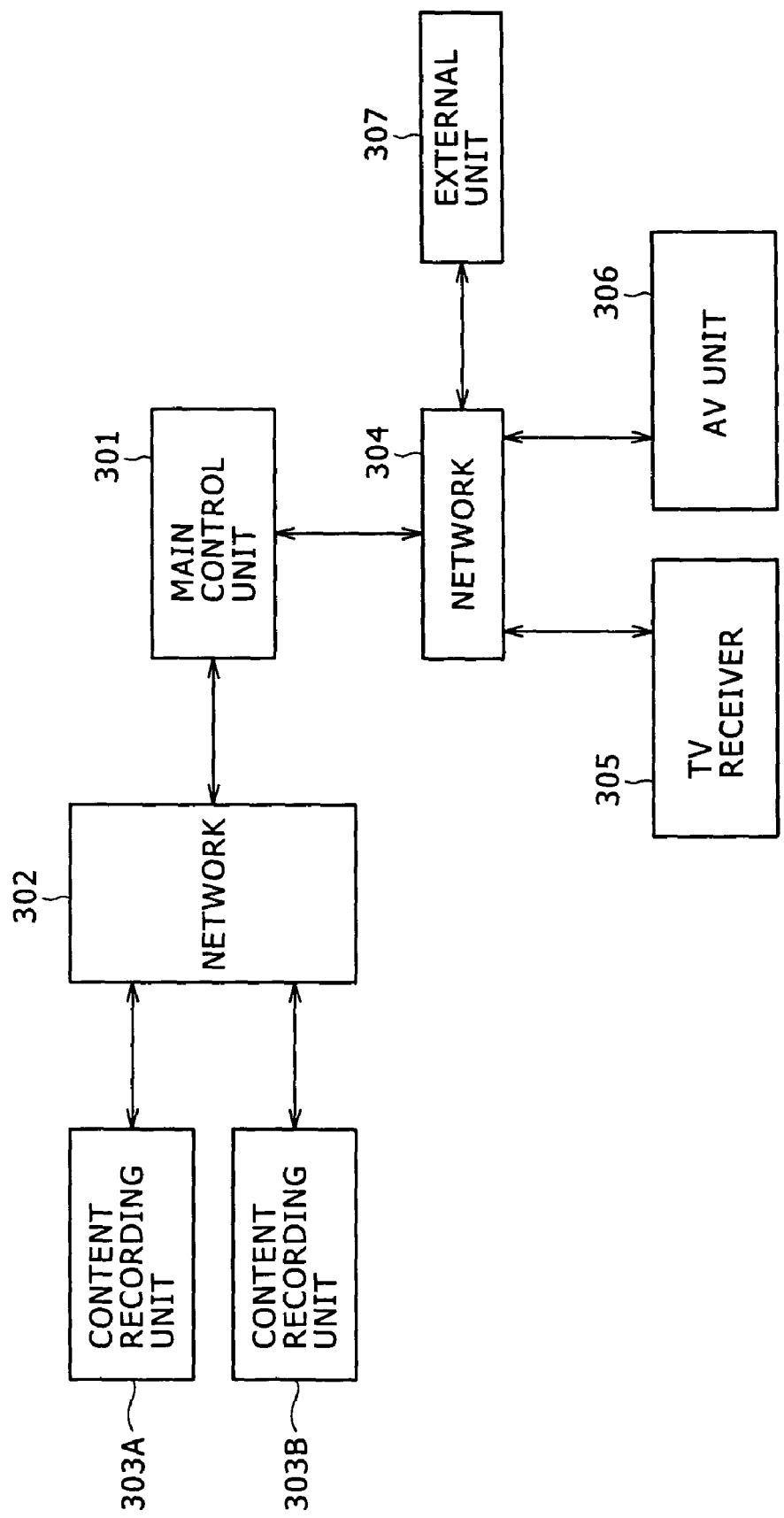
FIG. 17 is a block diagram that represents an exemplary structure of the information processing system to which the invention is applied (different from the one shown in FIG. 1).

More specifically, the invention may be applied to the information processing system as shown in FIG. 17. In other words, FIG. 17 shows the exemplary structure of the information processing system to which the invention is applied.

In the information processing system shown in FIG. 17, a main control unit 301, content recording units 303A and 303B are connected with one another via a network 302.

Referring to FIG. 17, the main control unit 301, content recording units 303A and 303B have functions corresponding to those of the main control unit 11, the content recording units 13A and 13B, respectively. The main control unit 301, content recording units 303A and 303B have functional structures similar to those of the main control unit 11, content recording units 13A and 13B as shown in FIGS. 4 and 5.

The main control unit 301, content recording units 303A and 303B have no need to have the same hardware structures as those of the main control unit 11, content recording units 13A and 13B. However, they may have the same hardware structures. The main control unit 301 may be formed as shown in FIG. 2, and the content recording units 303A and 303B may be formed as shown in FIG. 3, for example.

Likewise the content recording units 13A and 13B which are referred to as the content recording unit 13 when they do not have to be distinguished independently, the content recording units 303A and 303B will also be referred to as the content recording unit 303 if needed hereinafter.

In the case where the main control unit 11 and two content recording units 13 are stored in a single enclosure, the enclosure and the main control unit 11 and two content recording units 13 constitute the content recording/reproducing device 1 as shown in FIG. 1.

In the case where each of the main control unit 11, and two content recording units 13 is provided at a different position as an independent unit like the main control unit 301, and two content recording unit 303, they may constitute the information processing system (partially) shown in FIG. 17.

If the system is defined to represent an entire apparatus formed of a plurality of processing portions and devices, FIGS. 1 and 17 represent examples of the information processing system to which the invention is applied. The difference between the system shown in FIG. 1 and FIG. 17 resides in the enclosure that contains the respective units.

In the example shown in FIG. 17, two content recording units 303 are employed. The number of the content recording unit 303, however, may be set to an arbitrary value in the same manner as the above-described content recording unit 13 without being limited to the example shown in FIG. 17.

The network 302 is not limited to a particular form, however, it may take the same form as that of the network 12 shown in FIG. 1.

Referring to the example of FIG. 17, the main control unit 301 is connected to a network 304 different from the network 302. This may allow the main control unit 301 to communicate with other units connected to the network 304 with respect to various information data. In the example shown in FIG. 17, the main control unit 301 communicates with a TV receiver 305, an AV (Audio and Visual) unit 306, and an external unit 307 with respect to the various information data via the network 304, respectively.

Although not shown in FIG. 1, the main control unit 11 (correctly the communication unit 29 shown in FIG. 2) may be connected to the network similar to the network 304 so as to communicate with the other devices connected thereto with respect to the various information data.

For the purpose of executing the above-described series of the process is executed by software, the program constituting the software is installed from the network or the recording medium into a computer installed in the exclusive hardware, or the one capable of executing various functions by installing various programs, for example, general purpose personal computer.

Besides the system body, the recording medium may be formed of not only a removable recording medium 31 shown in FIG. 2 which stores the program supplied to the user including a magnetic disk (floppy disk), an optical disk (including CD-ROM (Compact Disk-Read Only Memory), and DVD (Digital Versatile Disk)), a magnetic optical disk (MD (Mini-Disk)), and a semiconductor memory but also the ROM 29 or 42 that store the program as shown in FIGS. 2 and 3, and the hard-disk contained in the memory unit 28 or the HDD 56 shown in FIGS. 2 and 8, respectively.

In the example, the program (including video and audio signals) is carried through radio transmission (airwaves), but it may be carried through wire transmission like a cable TV broadcasting. The program in the specification refers not only to the program broadcasted on the airwaves and satellite waves but also contents delivered through the network, which has a wide concept. As described above, the program and the content are used as the equivalent terms. In view of this, the program information is not limited to the EPG (Electronic Program Guide) information but may be the one about the program as described in the specification (content) including the metadata of the general contents and the like.

In the specification, step for writing the program to be recorded in the recording medium includes the process executed in chronological order along the described orders, or executed in parallel or individually rather than chronologically.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing system which serves to input a timer record setting of a content, comprising:
    a dividing unit that divides a first timer record setting to record a content delivered from a predetermined source for a predetermined period into a plurality of second timer record settings each designed to record the content corresponding thereto, which is expected to be delivered for the predetermined period;
    a change unit that determines whether the content corresponding to each of the second timer record settings satisfies a predetermined condition, and changes a predetermined setting of the second timer record setting to record the corresponding content which has been determined to satisfy the predetermined condition using a change process preliminarily correlated with the predetermined condition; and
    an input unit that inputs the second timer record settings to record the corresponding contents, respectively, including the second timer record setting having the changed predetermined setting,
    wherein a priority order is assigned to respective information which includes the respective predetermined condition for each of the second timer record settings, and
    in which the system further comprises means for enabling a user to change the priority order.

2. An information processing system which serves to input a timer record setting of a content, comprising:
    a dividing unit that divides a first timer record setting to record a content delivered from a predetermined source for a predetermined period into a plurality of second timer record settings each designed to record the content corresponding thereto, which is expected to be delivered for the predetermined period;
    a change unit that determines whether the content corresponding to each of the second timer record settings satisfies a predetermined condition, and changes a predetermined setting of the second timer record setting to record the corresponding content which has been determined to satisfy the predetermined condition using a change process preliminarily correlated with the predetermined condition; and
    an input unit that inputs the second timer record settings to record the corresponding contents, respectively, including the second timer record setting having the changed predetermined setting,
    wherein
    a plurality of the predetermined conditions are provided to which corresponding priority orders are assigned, respectively; and
    the change unit determines whether the content corresponding to each of the second timer record settings satisfies at least one of the plurality of predetermined conditions, and changes the predetermined setting of the content corresponding to the second timer record setting which has been determined to satisfy the at least one of the predetermined conditions using a change process preliminarily correlated with the condition assigned with the highest priority order among the at least one of the predetermined conditions determined to be satisfied.

3. The information processing system according to claim 2, wherein:
    the change process preliminarily correlated with the predetermined condition assigned with the predetermined priority order among the plurality of predetermined conditions is used to change a first setting for recording the content that satisfies the predetermined condition assigned with the predetermined priority order to a second setting for inhibiting the recording thereof; and
    the input unit inhibits an input of the second timer record setting having the setting changed to the second setting through the change unit among the plurality of second timer record settings for recording the corresponding contents.

4. The information processing system according to claim 3, further comprising a set unit which sets at least one of the plurality of predetermined conditions, the priority orders respectively assigned to the plurality of predetermined conditions, and the change process correlated with the plurality of predetermined conditions upon a command of a user.

5. An information processing method of an information processing system for inputting a timer record setting of a content, the method comprising:
    dividing a first timer record setting to record the content delivered from a predetermined source for a predetermined period into a plurality of second timer record settings each designed to record the content corresponding thereto, which is expected to be delivered for the predetermined period;
    determining whether the content corresponding to each of the second timer record settings satisfies a predetermined condition, and changing a predetermined setting of the second timer record setting to record the corresponding content which has been determined to satisfy the predetermined condition using a change process preliminarily correlated with the predetermined condition;
    inputting the second timer record settings to record the corresponding contents, respectively, including the second timer record setting having the changed predetermined setting;
    assigning a priority order to respective information which includes the respective predetermined condition for each of the second timer record settings; and
    enabling a user to change the priority order.

6. A computer readable medium having stored thereon a program executable by a computer that controls a process of inputting a timer record setting of a content, the process comprising:
    dividing a first timer record setting to record the content delivered from a predetermined source for a predetermined period into a plurality of second timer record settings each designed to record the content corresponding thereto, which is expected to be delivered for the predetermined period;
    determining whether the content corresponding to each of the second timer record settings satisfies a predetermined condition, and changing a predetermined setting of the second timer record setting to record the corresponding content which has been determined to satisfy the predetermined condition using a change process preliminarily correlated with the predetermined condition; and inputting the second timer record settings to record the corresponding contents, respectively, including the second timer record setting having the changed predetermined setting;

assigning a priority order to respective information which includes the respective predetermined condition for each of the second timer record settings; and enabling a user to change the priority order.

* * * * *